United States Patent [19]

Monroe et al.

[11] Patent Number: 5,325,473
[45] Date of Patent: Jun. 28, 1994

[54] APPARATUS AND METHOD FOR PROJECTION UPON A THREE-DIMENSIONAL OBJECT

[75] Inventors: Marshall M. Monroe, Glendale; Willian G. Redmann, Moorpark, both of Calif.

[73] Assignee: The Walt Disney Company, Burbank, Calif.

[21] Appl. No.: 776,075

[22] Filed: Oct. 11, 1991

[51] Int. Cl.$^5$ .............................................. G06F 15/00
[52] U.S. Cl. .................... 395/129; 395/161; 348/761; 345/7; 345/122
[58] Field of Search ............... 395/125, 129, 130, 131, 395/152, 155, 161; 358/60, 61; 340/701, 703, 702, 705, 706

[56] References Cited

U.S. PATENT DOCUMENTS

| | | | |
|---|---|---|---|
| 1,653,180 | 12/1927 | Jalbert | 353/28 |
| 3,420,598 | 1/1969 | Goss | 359/446 |
| 3,610,745 | 10/1971 | Wilson | 352/40 |
| 4,076,398 | 2/1978 | Galbraith | 353/69 |
| 4,200,867 | 4/1980 | Hill | 340/703 |
| 4,243,315 | 1/1981 | Wolf | 355/52 |
| 4,539,585 | 9/1985 | Spackova et al. | 358/93 |
| 4,633,416 | 12/1986 | Walker | 395/131 |
| 5,115,305 | 5/1992 | Baur et al. | 358/60 |

OTHER PUBLICATIONS

Microsoft Windows Paint User's Guide, Version 2.0, 1987, pp. 12–21.
Microsoft Paintbrush User's Guide, 1986, pp. 34–35.

*Primary Examiner*—Mark K. Zimmerman
*Attorney, Agent, or Firm*—Pretty, Schroeder, Brueggemann & Clark

[57] ABSTRACT

A projection apparatus and method for vivid and realistic projection is disclosed, with applications to amusement and optical engineering. Contemplated applications of the invention also include video shopping applications and cosmetic applications. Graphics data is entered into a user interface and is processed to generate an output representing an image to be projected onto a three-dimensional object. This output controls a light filter, such as a plurality of optically superposed color composite liquid crystal panels, to selectively filter projected light so that an image having a desired appearance is projected upon the object. The projected image may be interactively modified and it may also be stored in memory and projected as part of an image sequence so as to create apparent motion in the object.

30 Claims, 5 Drawing Sheets

APPARATUS AND METHOD FOR PROJECTION UPON A THREE-DIMENSIONAL OBJECT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to projection devices and, more particularly, to an apparatus and method for projection upon a three-dimensional object.

The projection of an image onto a three-dimensional object having various contours and shapes is not an easy task. It is generally known that the correction of all optical distortion problems inherent in flat, two-dimensional image projection is especially difficult when working with three-dimensional projection surfaces. These problems include proper image registration on the object, proper keystoning, corrections to ensure appropriate perspective appearances and focusing of the image within a specified range of depth.

Through the years, various attempts have been made to project images onto three-dimensional objects. For example, from the days of early artists it has been known to transfer three-dimensional images to two-dimensional images by using a pane of glass and tracing the three-dimensional image by eye onto the glass. In general, these three-dimensional images could not be accurately reconstituted from the glass by projection, because the human eye cannot reproduce the optical distortions induced by the condensing and objective lens systems used in most projectors. This is due in large part to the fact that the human eye generally cannot perceive depth or perspective in projected images.

In recent times, artists have nevertheless used projection in an effort to recreate three dimensional images. Attempts have been made, for example, to use two distinct but overlapping image projections of polarized light to create an illusion of depth. In these circumstances, special three-dimensional viewing glasses are worn for viewing the polarized image projections. These viewing glasses filter the polarized light to present one of the image projections to each eye. The discrepancies between these image projections create the impression of depth in the image.

Other approaches, such as holography, present a three-dimensional image through the interference patterns of two distinct projections of coherent light. In these applications, the phase difference between the light projections is varied such that some points in three-dimensional space appear brighter than others because of the superposition of the crests of the light waves.

The foregoing approaches have inherent limitations, however. Holograms, for example, are very limited in color pallet and exhibit uncontrollable color shift with varying viewing angle. The techniques they employ simply are not practical for reproducing a three-dimensional image from a two-dimensional depiction, because the two-dimensional image has to be initially captured and subsequently processed to include a depth component so that a three-dimensional image can be reconstituted.

Attempts have also been made to recreate three dimensional images by projecting a two-dimensional image upon a stationary three-dimensional object or a molded screen. However, these images are very difficult to edit and they cannot be modified in real time. The need for registration and alignment between the projected two-dimensional image and the three-dimensional projection surface affects the utility of these methods. Additionally, the requirement that these three-dimensional images be recorded in advance generally necessitates film preparation, which further contributes to the registration and keystoning difficulties, not to mention focusing problems associated within the desired depth of field.

In yet another system, interactive image modification is provided through a video shopping device that superimposes computer generated apparel upon an image of a human figure which is captured by a video camera. The human figure adorns an orientation identifying feature that can be recognized by image control circuitry which maps the appropriate orientation of the computer stored apparel image onto the figure and which then displays the composite two-dimensional image upon a viewing screen. This method, however, has drawbacks in that it requires a human figure to wear at least one orientation identifying feature, and it does not provide for the projection of vivid and realistic three-dimensional images. A method of projection which can interactively recreate three-dimensional images from two-dimensional depictions without the need for a video camera, advance processing or the adornment of orientation identifying features would therefore be desirable.

Accordingly, there has existed a definite need for an apparatus and method of projection which can recreate three-dimensional images from two-dimensional depictions without advance processing, and which solves the distortion problems inherent in flat image projection. Additionally, there has existed a need for such an apparatus and method that would allow for interactive image modification, and would therefore have applications in a wide range of fields, including by way of example, a guest-interactive amusement attraction, optical engineering, video shopping and cosmetic surgery. The present invention satisfies these needs and provides further related advantages.

SUMMARY OF THE INVENTION

The present invention provides an apparatus and method for projecting images upon a three-dimensional object so as to impart a vivid and realistic appearance upon that object. The apparatus employs graphics processing equipment and a projection means for projecting an image upon the object in a manner which allows for user interaction with the projected image. Specific methods in accordance with the invention allow for an image to be created corresponding to the surface contour of the object, as well as the definition of regions within that contour which may be independently processed for projection upon the object. In this way, a user or guest may create and edit a complete artwork data file which contains all of the perspective, registration and optical keystoning corrections necessary for projecting a vivid and realistic image, and which accurately conveys depth when projected upon the object. The projected image also can be modified in real time, providing animation, interactivity, transformation and even translation.

More particularly, the apparatus includes a projector and an addressable light filter means which is adapted to filter and color the light projected onto the object. A user interface means receives graphics data for the creation of a properly aligned projection contour and regions within the contour. The graphics data is then fed to a graphics processing device, such as a computer coupled to the addressable light filter means, to generate and control projection of the desired image utilizing multi-dimensional bit-mapping.

In one form of the invention, the user interface means consists of a user interface and one or more simplified guest interfaces. A simplified guest interface, which may be in the form of a Polhemus device, joystick, gimballed stylus, mouse, etc., may be added so as to permit a guest of the user to input graphics data that is used to manipulate color patterns projected onto regions of the object without user supervision. The data received from the simplified guest interface corresponds to a particular position on the object and allows for selection of an active color pattern and for selective painting of that color pattern upon a region corresponding to the position on the object. Contour and other graphics data is typically generated at the user interface, which may include a stylus and digitizing pad or a mouse, by tracing an image or the like on the object.

The computer processes the graphics data and generates an output representing an image which corresponds to the surface contour of the object, as traced by the user. This output controls the light filter means and commands it to filter the projected light such that the image is projected onto the object in various colors, with the appearance of shading, surface textures and other characteristics as desired In one aspect of the invention, the light filter means includes two or more optically superpositioned liquid crystal panels that are individually composited with a color filter. These displays are controlled in response to the output from the computer to filter the light from the projector to thereby produce color components and other projection features of the image. In addition, a display monitor also may be provided for connection to the processing device to permit two-dimensional display of the bit map data file on the monitor. Typically, the liquid crystal filter may be driven from the same graphics signal that is supplied to control the display monitor, and therefore consists of three such displays that subtract light for creating a color projected image.

In another aspect of the invention, the processing device comprises a computer having graphics software, with the display monitor being coupled to the computer. The graphics software is designed to store the processed graphics data in a memory, and to permit graphics data and image projection patterns corresponding to locations on the object to be created, generated, modified, maintained, erased or retrieved for subsequent projection.

In another form of the invention, a method of projecting an image onto a three-dimensional image is provided. The method includes the steps of entering the graphics data into the graphics input device and then processing that data to generate an output representing an image which corresponds to the surface contour of the object. The light filter is then controlled in response to the output to filter light from the projector such that the image is projected onto the object with a desired appearance. In various aspects of this method, the output may be stored in a buffer and then processed by the user to interactively modify the image. In addition, the output representing the image may be stored in a memory for subsequent recall and projection on the object. In this regard, a plurality of outputs may be stored to form a sequence of different but related images for sequential projection upon the object so as to make the object appear to be in motion.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
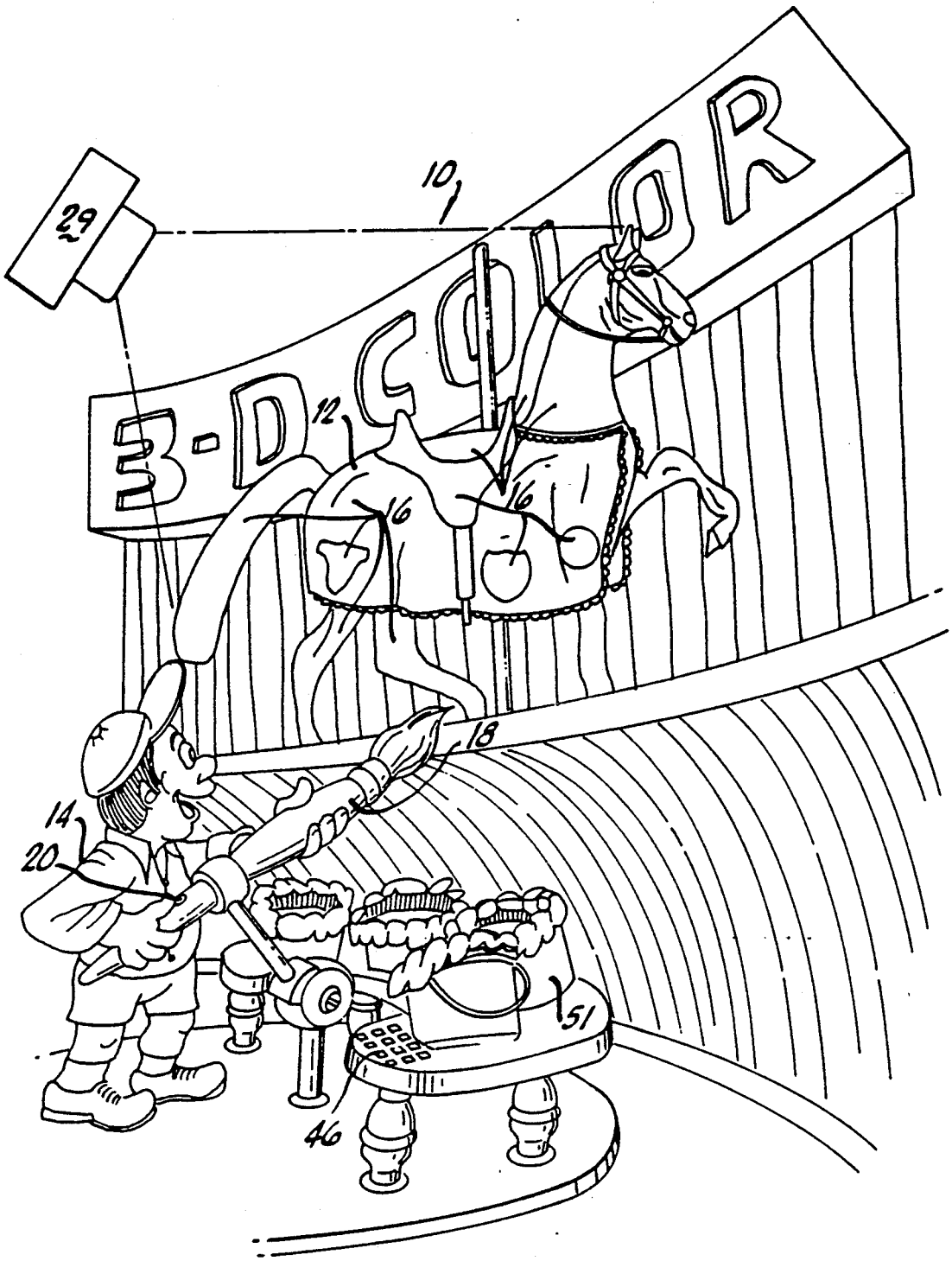
FIG. 1 is a perspective view of an apparatus embodying the novel features of the present invention, showing a three-dimensional object and a simplified guest interface according to one preferred embodiment of the current invention.

As shown in FIG. 1, the preferred embodiment of the present invention is embodied in an amusement apparatus, generally referred to by the reference numeral 10, for use in projecting images onto a three-dimensional object 12, for example, having the form of animated characters on a stage. An amusement guest 14 positioned in front of the object 12 directs a wand 18 at regions 16 of the object and utilizes a button 20, located on the wand, for selectively coloring or drawing upon a region determined from the orientation of the wand.

Figure 2:
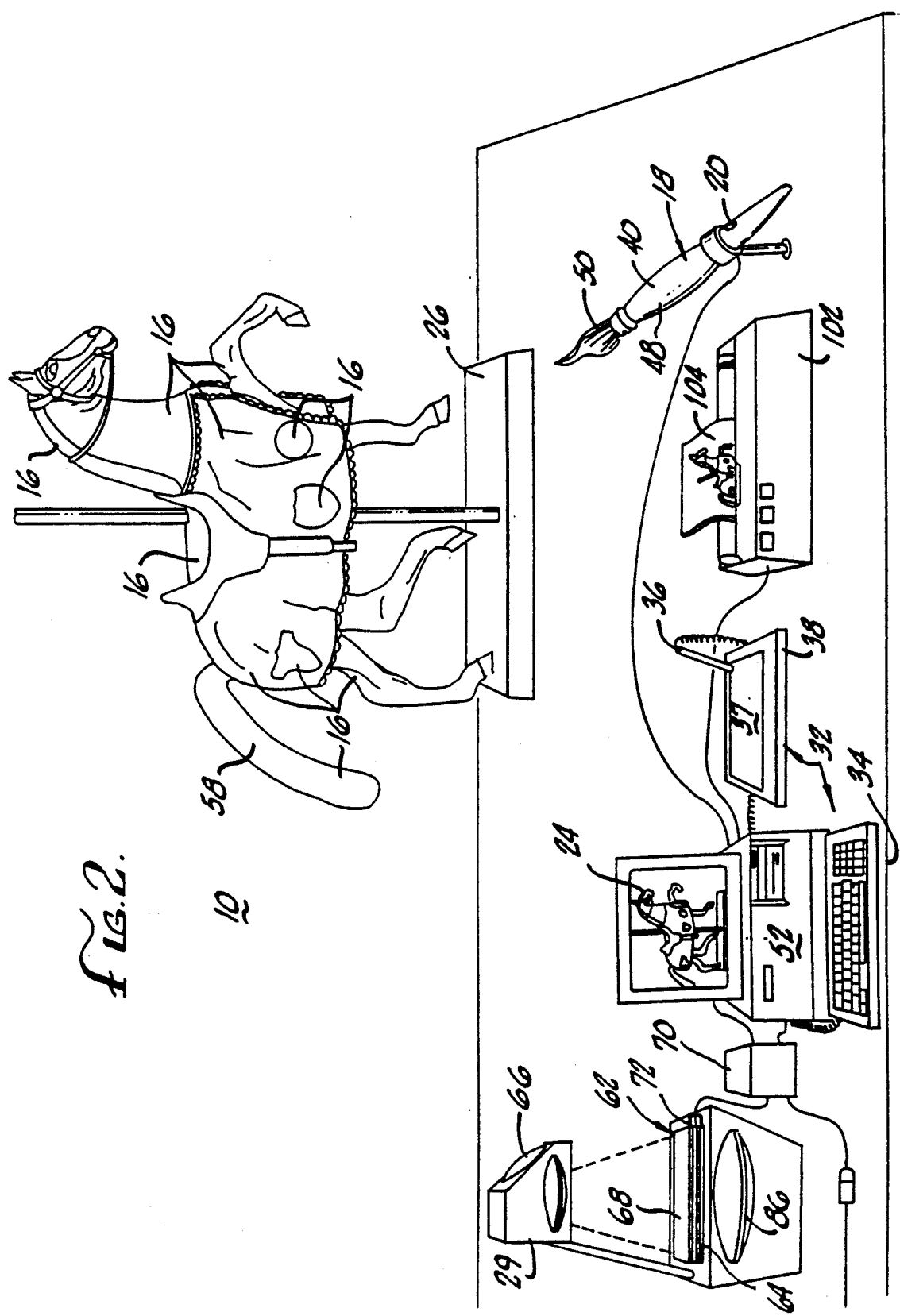
FIG. 2 is another perspective view of the apparatus, showing a colorless three-dimensional object, projector, computer and interface for controlling projection upon the object.
Figure 3:
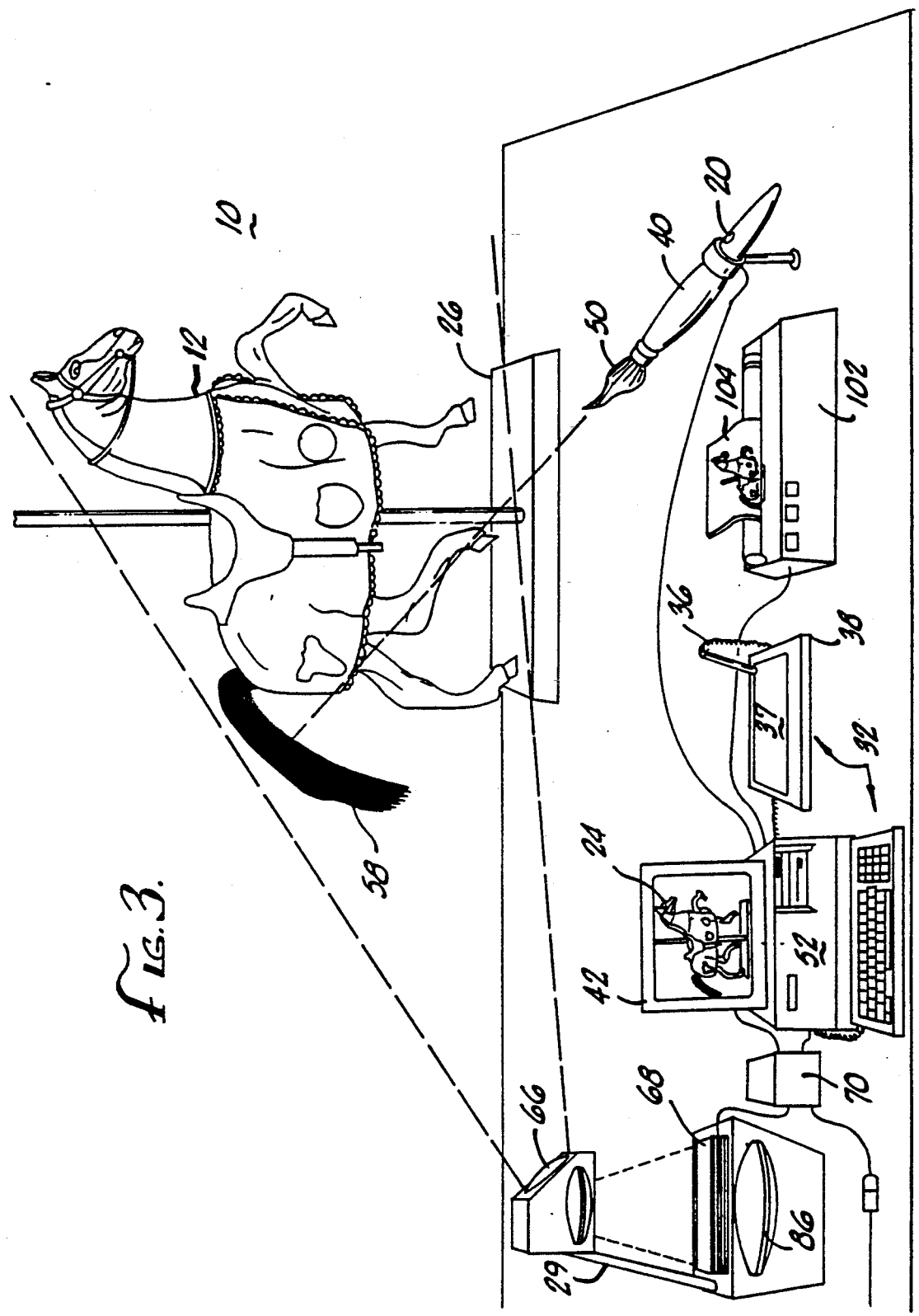
FIG. 3 is another perspective view, similar to FIG. 2, showing projection of an image upon the three-dimensional object as selected by the simplified guest interface.

FIGS. 2–3 show the apparatus 10 in more detail. As shown in FIG. 2, the three-dimensional object 12 is in the form of a carousel horse supported on a raised platform 26 or the like. The three-dimensional object is a Bas-Relief with attention paid to avoiding "undercuts" where the projected light can't reach. While the object illustrated in the preferred embodiment is an animated character, it will be appreciated that various other types and forms of three-dimensional objects having diverse surface shapes and configurations may be used in the context of the present invention. In the preferred embodiment, the surface 28 of the object 12 is monochromatic neutral-colored projection surface. In this way, the images projected upon the object will not be affected by unwanted colors on the object itself.

In accordance with the invention, the apparatus 10 includes a projection means that is aligned so as to project light upon the object 12. The projection means, which may include any device suitable for projecting light, or a liquid crystal display projector or light valve projector, is illustrated in the preferred embodiment as comprising an overhead type projector 29 with a large format liquid crystal light filter. As described in more detail below, data processing means are responsive to inputs received by a user interface means for processing graphics data to generate an image 24 and for controlling projection of image upon the object 12.

More particularly, the data processing means includes a computer graphics system 30. The user interface means may have one, two or even more interfaces for interaction with the computer graphics system 30. In the preferred embodiment, there is typically a single user interface 32, consisting of a keyboard 34 and gimballed stylus 36 with a drawing surface 37 of a digitizing pad 38, and one or more simplified guest interfaces, generally referred to by the reference numeral 40. The simplified guest interface 40 may be any device that allows a guest to position a projected cursor or otherwise indicate position on the object 12, decide to paint a region or draw upon the object and select a current color pattern for projection onto the object.

In using the preferred embodiment of the apparatus and method of the invention, a user enters graphics data at the user interface 32 to define "regions" corresponding to positions 16 on the object 12. By inputting the data via the keyboard 34 and stylus 36 and digitizing pad 38, the user can trace the object while viewing both the projection of the traced lines on the object 12 and the formation of contours as depicted on a computer monitor 42. The user preferably creates by these contours at least one computer region corresponding to the object 12 and may further subdivide each region into multiple regions and store to memory the created image. The system is then set up for interaction with an amusement guest via the simplified guest interface 40.

Although the user interface 32 of the preferred embodiment utilizes a keyboard 34, stylus 36 and digitizing pad 38, there are many devices that may be equivalently employed as a user interface, for example, a digitizing pad and stylus alone, or a mouse, or a keyboard alone, or a track ball, as well as any other device that is effective to input data to the computer graphics system 30.

Figure 6:
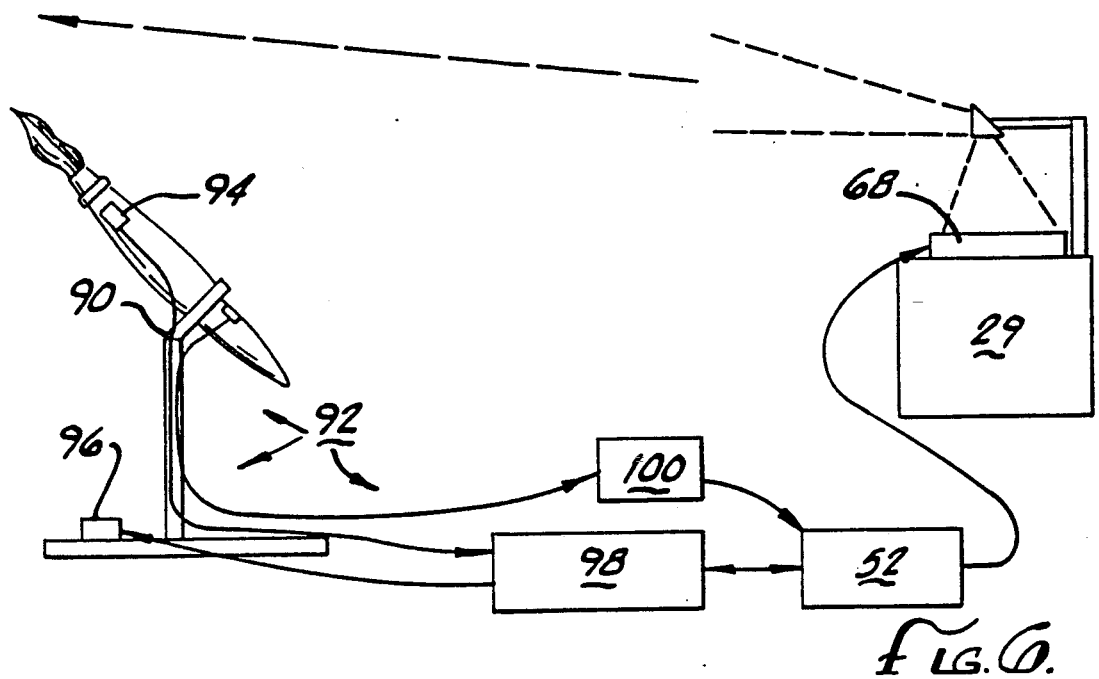
FIG. 6 is another block diagram showing the functional interaction between a polhemus device, the computer and an overhead-type liquid crystal filter projector.

The guest 14 may use the simplified guest interface 40 to projectively color the object 12 in accordance with data provided by the guest 14. In the preferred embodiment, the simplified guest interface 40 includes the wand 18, a "mouseclick" button 20, and a set of twelve color pattern buttons 46. Four of these buttons will select a pattern, e.g., polka dot, stripes, stars and crescent moons, etc., and eight buttons are employed to present a color selection. The wand 18 may be presented as shown in FIG. 1, having an enlarged paintbrush 48 having a bristle-end 50 that is to be pointed at a position on the object 12. By pushing the mouseclick 20, which as shown in FIG. 6 is a button on the rearward end of the paintbrush 48, the simplified guest interface 40 causes the computer graphics system 30 to projectively paint a portion of the object 12 corresponding to the wand's orientation with the current color pattern. As an optional feature to the embodiment shown in FIG. 1, the bristle-end 50 may carry lights for illuminating the bristle-end with the current color pattern, in a manner to simulate paint on the bristle-end of the brush.

As a further refinement of the preferred embodiment, the simplified guest interface 40 may present the guest with an option to projectively paint brush strokes or draw upon the object 12, in addition to flooding portions of the object as defined by the software delineated "Regions."

There are many devices that may be incorporated into the simplified guest interface 40 to emulate signals to the computer graphics system 30 for identification of the paintbrush's 48 orientation with respect to the object 12. As shown in FIG. 6, the wand 18 may house a so-called Polhemus device 92. The polhemus device utilizes low-frequency magnetic field technology to determine the position and orientation of a sensor 94 in relation to a source unit 96 and presents information representative of six degrees of freedom in ASCII or binary format. In the preferred embodiment, a unit sold under the name 3SPACE ™ ISOTPRAK ™ has been found to be acceptable. There are, however, other units that may also be conveniently used in accordance with the invention. Utilization of a polhemus device may require modifications to the computer's graphics software such that the software accepts the protocol of the polhemus' data output. These modifications are well within the skill of anyone familiar with computer programming. For convenience, FIG. 7 includes a block diagram that illustrates the logic steps that the software incorporating the modifications needs to accomplish. A more detailed statement of the software is also located at the end of this detailed description.

In use, the guest 14 manipulates the wand 18 to provide data to a computer 52 in a manner to projectively draw upon the object 12 or paint portions 16 of the object 12. By processing the graphics data fed to the computer 52, all of the perspective, registration and optical keystoning corrections necessary for exact alignment of a re-projected image onto the object 12 are made.

The processing of the graphics data may be divided into two segments. In the first, input from the user (not shown) to the user interface 32 is used to create an artwork data file. The user traces closed contours corresponding to portions 16 of the object 12 which are bit-mapped and used to define "regions" via the software. These contours are aligned in projection with the object, because the user has observed the projected contours corresponding to the portions 16 of the object 12 contemporaneously with their having been traced upon the object. Inputs from the user interface 32 are also received to indicate color, shading, texturing and perspective which are selectively assigned to regions. This artwork file is then ready for interaction by guests, and may be stored to memory of the computer 52 if it is desired to recall the original artwork data file or impose a default image projection. The artwork data file also can be enhanced on the computer 52 by using the keyboard 40 to select appropriate commands so that when the images are projected onto the object, as shown in FIGS. 3–4, the object 24 appears to be a real character having appropriate coloring, shading and desired textured appearances.

The second segment of data processing includes processing of data from the simplified guest interface 40 to allow guest manipulation of the image. The guest 14 enters data via the simplified guest interface 40 that accesses the artwork data file. As the name implies, the simplified guest interface 40 may be any interface that permits the guest to interact with the artwork data file, and preferably allows only limited access to that file, i.e., the guest 14 preferably does not have the choice to completely erase all information corresponding to the object 12 including definition of regions. In the preferred embodiment, the guest 14 may employ the twelve buttons 46 to select a current color pattern and then utilize the mouseclick 44 to assign that color pattern to one of the pre-defined regions that is identified by the orientation of the wand 18 such that the bristle end 50 of the paint brush 48 points to the portion 16 of the object that corresponds to that region.

Figure 4:
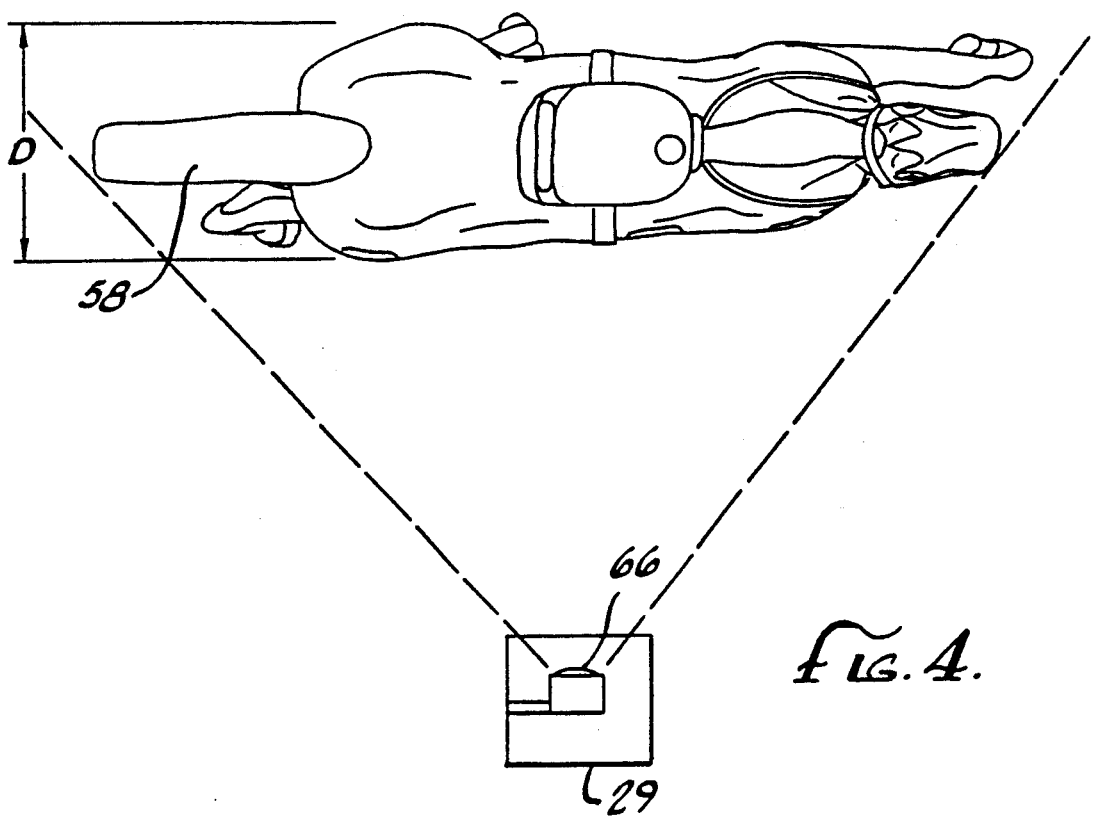
FIG. 4 is a plan view of the object and a projection device used for projecting the image onto the object and illustrates the depth of field of the object.

By way of example, if a user desires to facilitate projection of an image on the character's tail 58 shown in FIGS. 2–4, the user will first trace the boundaries of the tail 58 by watching a projection pen tip of the stylus 36 create a contour on the object 12 itself. As graphics software has formatted for display on the computer monitor 42 an image created by the bit-mapping of the data received from the user interface 30 corresponding to the trace, the VGA signal emulated by the computer 52 to the monitor 42 is readily used as the projection control signal for the image. Once the outline of the tail 58 has been traced, a guest 14 may subsequently utilize the wand 18, mouseclick 20 and set of buttons 46 to select in real time an appropriate color, shading or the appearance of a particular texture to be projected within the traced area.

As an alternative option, a single button may replace the set of twelve buttons 46 which, when depressed, causes the computer 52 to select a new current color pattern. Or, color pattern selection could also be made by directing the wand 18 at a target, such as a paint bucket 51 of FIG. 1, and pressing the mouseclick 20.

In the preferred form of the invention's embodiments, entry of the graphics data via either of the user interface 32 or the simplified guest interface 40 generates signals which are transferred to a computer 52. The computer may be chosen to be a personal computer having one or more disk drives 54 for receiving graphics software. The keyboard 34 and the visual display monitor 42 are coupled to the central processing unit of the computer. The computer processes the graphics data entered by the user on the digitizing pad 38 and generates a VGA format RBG output corresponding to the image drawn or traced upon the pad. This output is then emulated to both the monitor 42 and the projector 29 for projection onto the object 12. In the preferred embodiment, the computer comprises a Macintosh personal computer manufactured by Apple Computer, Inc. of Cupertino, Calif. In the case of computers other than the Macintosh, a VGA board may be necessary for emulation of signals for driving the projector 29.

As shown in FIGS. 2 and 3, projector 29, which is preferably an overhead type projector, is aligned to face the three-dimensional object 12 and includes a 1,000 watt light source 86 for projecting light upon the object. An addressable light filter means 62 is mounted on the projector 29 in between an objective lens 64 and a condensing lens 66. These two lenses are conventional in most overhead-type projectors to enable focusing and alignment of the light for projection purposes. In the present invention, however, the objective lens and condensing lens are specially configured to provide a relatively large depth of field as shown by the reference designation D in FIG. 4. This is accomplished by using a wide angle objective lens 64. The addressable light filter means 62, which is taken to include any projection device that electronically enables projection of an image by filtering light, is coupled to the computer 52 and is adapted to selectively filter the light projected onto the object 12 in response to output control signals generated by the computer.

In the preferred embodiment, the light filter means 62 comprises a plurality of optically superpositioned liquid crystal panels 68. Each of these panels is composited with a color filter and is comprised of a plurality of addressable pixels (not shown) which are individually controlled in response to the computer output to generate color elements for the composite image. As mentioned, the liquid crystal panels 68 in the preferred embodiment are designed to accept VGA format signals from the computer 52. Accordingly, an RGB transcoder 70 is connected between the computer 52 and the liquid crystal panels 68 to convert the high resolution output graphics signals, generated by the Macintosh computer, into a VGA format.

The liquid crystal filter 68 is comprised of three superpositioned filters, yellow, cyan and magenta, and accordingly has 3 liquid crystal panels that are individually composited with these light filters. These secondary colors are chosen to subtract light from the projected light to project the image upon object. In addition, commercially available liquid crystal filters include a circuit, designated by the reference numeral 72 in FIGS. 2–3, that appropriately converts an RGB signal from the computer into control signals for each of the three panels.

Figure 5:
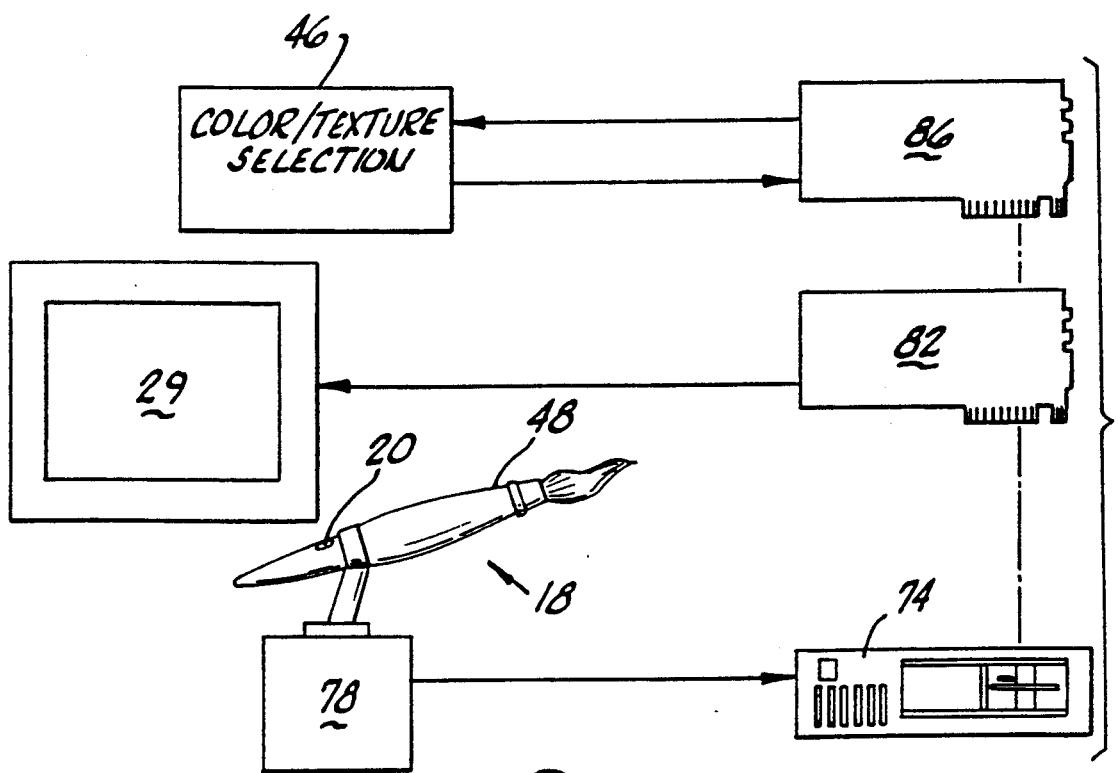
FIG. 5 is a block diagram depicting the functional interaction between the computer, the simplified guest interface, a liquid crystal filter projector, and a switch/lamp assembly.

FIG. 5 shows a functional block diagram of an embodiment of the system that utilizes an IBM compatible personal computer 74. The wand 18 is in the form of a joystick 78 with the familiar paintbrush 48 mounted at the end of the joystick. The mouseclick 20 is also located on one of the paintbrush and the joystick. The wand 18 is coupled to the personal computer which is fitted with I/O boards 82 and 84 for communication, with the LCD overhead display 29 and a twelve button set 46 for selection of colors and patterns, respectively.

FIG. 6 shows a partial connection block diagram of the preferred embodiment, including the wand 18 that includes the paintbrush 48, a pivotal mounting 90, and the polhemus device 92. The polhemus device 92 consists of a sensor 94, a source 96 and a polhemus controller 98 which emulates signals for receipt of the controller. Selection of a region identified by the orientation of the paintbrush 48 is accomplished by pushing the mouseclick 20, which is coupled to a mouse device 100. The mouse device 100 serially emulates a digital word to the computer 52 that indicates to the computer 52 and to the custom software that the guest desires to modify the current region. The computer 52 then edits the bit map data file stored in memory and emulates signals to the monitor and liquid crystal filter 68 of the overhead projector 29 to project the image upon the object 12.

In the preferred embodiment, the projector 29 has a one-thousand watt light source 86 for projecting the images onto the object 12. When using this arrangement, it has been found that liquid crystal panels 68 having a ten-inch-by-ten-inch cross-section mounted over the condensing lens 66 are best suited for in-focus projection over approximately a twenty-inch range of depth D with respect to the three-dimensional object 12. Of course, the lens system of the projector 29 may be modified as desired to achieve a different in-focus range of depth D over the object 12. Whatever range of depth D is selected, however, care must be taken to ensure that the surface 28 of the object 12 to be projected upon does not have a contour that varies from front to back by more than the desired range of depth.

By selecting the projection optics and optimizing the range of depth in which a focused image will be projected upon the object 12, a very high quality image can be generated, aligned on the object and enhanced by the computer graphics system 30 so that the user or other viewers will perceive the object 12 as having full, realistic three-dimensional features.

Sophisticated graphics software is used to select and generate various colors, shading effects, the appearance of texture, animated transformation, and other commands for processing, manipulating, editing and storing the image to be projected on the object 12. If a Macintosh brand personal computer is used, then commercial software programs sold under the names PIXEL PAINT, TM PHOTO SHOP TM OR MACROMIND DIRECTOR TM are suitable software programs (the latter offering the added feature of animation as well as bit-map painting) for processing of graphics data. When an IBM format personal computer is used, software programs sold under the names DELUXE PAINT II TM or ANIMATOR TM are suitable (the latter being an animation program as the name implies).

Figure 7:
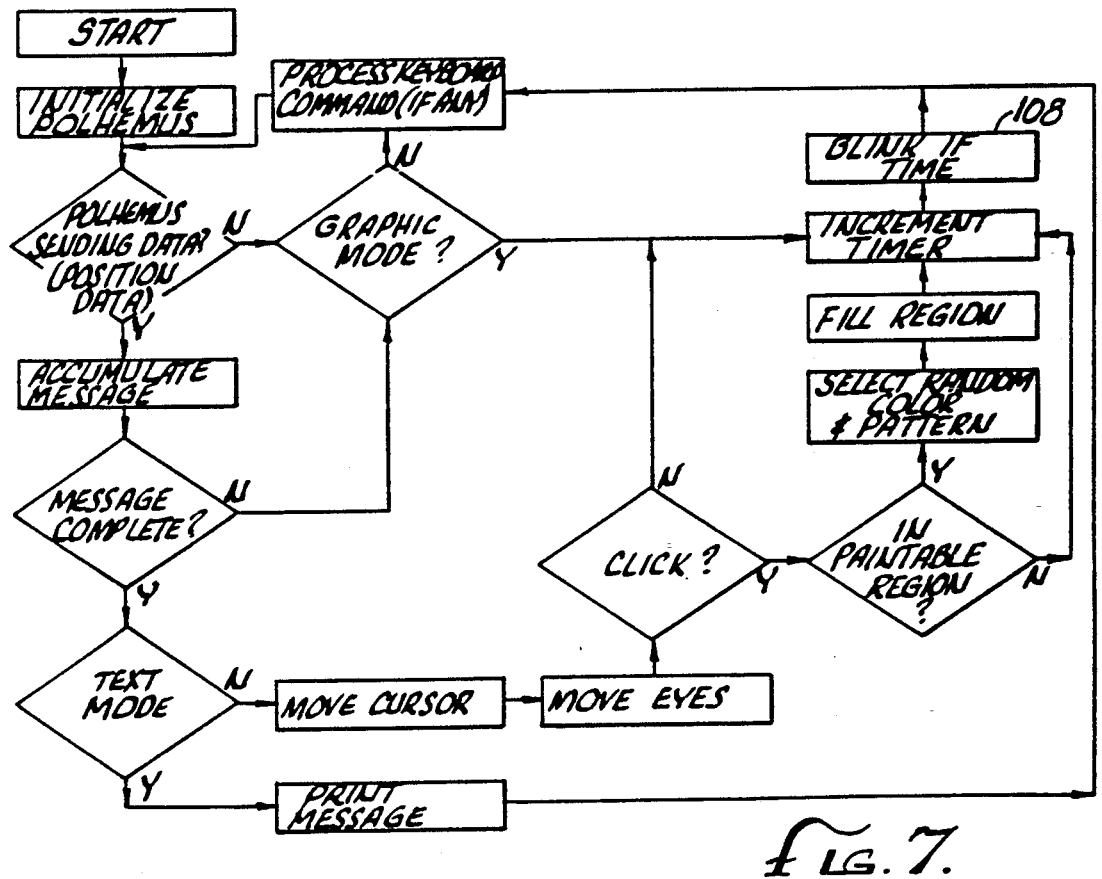
FIG. 7 is a logic block diagram of the software necessary to direct the computer of the preferred embodiment to control projection of an image according to the current invention.

Also, as mentioned, additional software may be necessary in order that these programs can receive data from non-standard inputs. The Polhemus device 92 of the preferred embodiment is such a non-standard input. FIG. 7 shows a block diagram of the software used to control projection and the sophisticated graphics software and communication with peripherals, such as the simplified guest interface 40, to boards 82 and 84 and Polhemus device 92. Appendices A-F are a more detailed statement of this software.

In another aspect of the invention, a printer 102 is connected to the computer 52. The printer is adapted to produce hard color copies 104 of the viewed image for the amusement of the guest 14 or other viewers. This feature has special usefulness when the apparatus 10 is used as an amusement device in an amusement park or the like, since the guests will be able to take a sample of their design home with them. The printer 102 also has advantages to artists and others who may use the apparatus 10 in a commercial environment or other contexts. Engineers can use the device for analyzing and comparing different optical systems.

In operation, after all of the equipment described above is connected to the power source and turned on, a user will pick up the stylus 36 and apply it to the drawing surface 37 of the digitizing pad 38. Once the virtual pen tip of the stylus contacts the drawing surface, the user will see this pen tip as a point on the visual monitor 42 and on the three-dimensional object 12. Once an appropriate starting point has been selected, the user may, for example, trace the contours, forms and outline of the projection object 12 by watching the pen tip of the stylus 36 move around on the object. The traced image, which is displayed on the monitor 42 and object 12, defines software regions that carry data signifying desired colors, shading, or the appearance of texture. For example, the user may trace forms corresponding to items of clothing to be displayed upon the object, each such item having a corresponding region.

When the user has finished tracing on the digitizing pad, a two-dimensional bit-mapped digital artwork data file will have been created and may be stored in the computer 52. The artwork file thus contains graphics data which is processed by the computer 52 in conjunction with the graphics software to generate an output representing the images traced by the user.

The system is then ready for interactive use with a guest via a simplified guest interface. In the preferred embodiment, the simplified guest interface has been chosen to include a polhemus device 92, but any interface sufficient to designate or change position is sufficient. For example, a mouse or a joystick may be used in equivalent fashion.

The computer 52 then processes this graphics information to generate the desired image for projection onto, for example, the character's tail 58, as shown in FIG. 4.

Because the user and the guest 14 may observe the results of moving the wand 18 by looking up at the projection object 12 and observing a moving cursor, contour or virtual pen tip, the projected image registers exactly with the object's appearance or shape. In this way, the object will have high-quality three-dimensional color images and characteristics of three-dimensional form.

As shown in FIG. 7, user created software translates inputs from the simplified guest interface 40 for acceptance by the sophisticated graphics software, and performs incidental tasks, such as periodic blinking of the character's eyes (not shown). As an example, the software of the preferred embodiment for interaction with the sophisticated graphics software is attached hereto as Appendices A-F.

By using sophisticated graphics software of the type identified above, the user has the option of selecting commands using the keyboard 36 which are displayed in a border on the computer monitor 42. These commands allow for presentation to the guest of selection of various colors, shading effects, the appearance of textures, and various other commands for manipulating, storing and editing the displayed image. In this regard also, modification of the graphics software may be necessary if the simplified guest interface is to be presented a limited subset of available colors, or with only a decision to select a new color pattern rather than select from a range of color patterns available. Alternatively, the switch I/O board 84 may be configured with physical switches (not shown) to allow changes in the emulated protocol such that the graphics software may recognize signals emulated by the I/O board 84 as representing alternate sets of colors and patterns.

In other aspects of the invention, the output representing the image may be stored in a memory of the computer 52 such that it may be recalled and subsequently projected onto the object 12 as desired. By storing a plurality of these outputs, a sequence of different but related images may be collated. When these stored images are sequentially projected upon the object 12, the object may appear to be in motion or to display some other characteristic of movement, even though the object 12 itself is stationary. For example, FIG. 7 contains a software block 108 that automatically projects eyes on the object that appear to be blinking. An alternative, but as yet untested application of the present invention, would be to have a physical mechanical movement of the object. Video information could then be synched to the physical movement and a file of projected animation designed. By projecting the two-dimensional image in exact synchronization with the repeated movement of the projection object, a three-dimensional object having a wide range of physical movement would result.

The present invention has far ranging applications, including the fields of video shopping and cosmetic surgery, as well as the amusement field. As an example of the invention's application to video shopping, an image may be projected upon a shopper (not shown) to create an impression that the shopper is wearing desired apparel. In accordance with the invention, the shopper's outline may be traced and a specific field within that outline traced, perhaps corresponding to a shirt on the shopper's torso. The graphics information generated by this tracing may thereafter be processed and the light filter may be controlled such that green polka dots, for example, appear on the shopper's torso to make it appear that the shopper is wearing a green polka dotted shirt. Similarly, images may be projected upon a model of a car or house (also not shown) so as to impart apparent colors, styles or customizations to the car or house. As an example of the invention's cosmetic applications, features desired by cosmetic surgery may be projected onto the subject. The quality of projection is so good that the subject may be made to appear to have a different shaped nose, a beard, eyebrows, or nearly any other physical characteristic.

One specific contemplated use of this invention is as a guest operated amusement device, such as a three-dimensional coloring book for artistic applications. The device could be used as a display or as an attraction at an amusement park, whereby users can designate color features for display on an object and see the results of their work as they do it, in three-dimensional rather than two-dimensional form. It should be understood, however, that the above-mentioned applications of this invention are listed as examples only, to illustrate the broad applications and the usefulness of this invention, and they are not intended to limit this invention in any way.

While a particular form of the invention has been illustrated and described, it will be apparent that various modifications can be made without departing from the spirit and scope of the invention. Accordingly, it is not intended that the invention.-be limited, except as by the appended claims.

APPENDICES

Appendix A is a software listing of a "C" language program that calls routines to set-up menus, windows, initialize the system, move the cursor, reset the polhemus and define the paint regions.

Appendix B defines menus for Macintosh and Polhemus set-up parameters and also handles menu actions.

Appendix C is a routine for implementing polhemus driven cursor movements.

Appendix D is a routine for initializing serial communications and pausing the polhemus output.

Appendix E is a routine for managing window/cursor sealing, region definitions, and random color/pattern files, cursor tracking and character eye blinking.

Appendix F is a resource file for dialog boxes and display.

APPENDIX A

© 1991 Walt Disney Imagineering

```
Brush.c
Wednesday, February 13, 1991  7:48 AM

/*
* Brush.c
* A simple paint tool using a Polhemus sensor as a brush
*
*/ extern  WindowPtr  PolhemusWindow;
extern  Rect       dragRect;
extern  int        GraphicMode;

Str255  unitsString = "\pinches";
Str255  IncrementString = "\p00.00";
CursHandle  PlusCursorHdl;

/****
* InitMacintosh()
*
* Initialize all the managers & memory
*
****/
```

```
InitMacintosh()

{
  MaxApplZone();
  MoreMasters();
  InitGraf(&thePort);
  InitFonts();
  FlushEvents(everyEvent, 0);
  InitWindows();
  InitMenus();
  TEInit();
  InitDialogs(0L);
  InitCursor();

}
/* end InitMacintosh */

/****
 * HandleMouseDown (theEvent)
 *
 * Take care of mouseDown events.
 *
 ****/

HandleMouseDown(theEvent)

EventRecord *theEvent;

{
  WindowPtr theWindow;
  int     windowCode = FindWindow (theEvent->where, &theWindow);

switch (windowCode)
      {
      case inSysWindow:
        SystemClick (theEvent, theWindow);
        break;

case inMenuBar:
        AdjustMenus();
        HandleMenu(MenuSelect(theEvent->where));
        break;

case inDrag:
        if (theWindow == PolhemusWindow)
          DragWindow(PolhemusWindow, theEvent->where, &dragRect);
        break;

case inContent:
        if (theWindow == PolhemusWindow)
          {
          if (theWindow != FrontWindow())
            SelectWindow(PolhemusWindow);
          else
            if (GraphicMode)
              {
              Point p;
              p = theEvent->where;
              GlobalToLocal(&p);
              PaintFillAt(p);
              }
            if (!GraphicMode)
              {
              /* arrange redraw of text */
              InvalRect(&PolhemusWindow->portRect);
              }
```

```
            }
        break;

case inGoAway:
        if (theWindow == PolhemusWindow && TrackGoAway(PolhemusWindow, theEvent->where))
            {
            HideWindow(PolhemusWindow);
            QuitRoutines(noErr);
            }
        break;
        }
}
/* end HandleMouseDown */

/****
 * HandleEvent()
 *
 *   The main event dispatcher. This routine should be called
 *   repeatedly (it handles only one event).
 *
 *****/

HandleEvent()
{
  int       ok;
  EventRecord theEvent;

HiliteMenu(0);
  SystemTask ();      /* Handle desk accessories */ ok = GetNextEvent (everyEvent, &theEvent);
  if (ok)
    switch (theEvent.what)
        {
        case mouseDown:
          HandleMouseDown(&theEvent);
          break;

case keyDown:
        case autoKey:
            if ((theEvent.modifiers & cmdKey) != 0)
                {
                AdjustMenus();
                HandleMenu(MenuKey((char) (theEvent.message & charCodeMask)));
                }
            break;

case updateEvt:
          BeginUpdate(PolhemusWindow);
          if (GraphicMode)
            {
            BackColor(blackColor);
            }
          else
            {
            BackColor(whiteColor);
            }
          DrawPolhemusWindow(((WindowPeek) PolhemusWindow)->hilited);
          if (GraphicMode)
            {
            DrawRegionOutlines();
            }
          EndUpdate(PolhemusWindow);
            break;

case activateEvt:
```

```
        InvalRect(&PolhemusWindow->portRect);
        break;

}
    SystemTask ();    /* Handle desk accessories */

}
/* end HandleEvent */

/*****
 * QuitRoutines()
 *
 * Clean up any stray processes, then quit.
 *
 *****/

QuitRoutines(ErrorCode)
    int ErrorCode;
    {
    CloseSerial();
    ClosePolhemusWindow();
    if (ErrorCode != noErr) SysError (ErrorCode);
    ExitToShell();
    }

/*****
 * main()
 *
 * This is where everything happens
 *
 *****/ main()

{
    InitMacintosh();
    SetUpMenus();
    SetUpWindow();
    InitializeSerialPort();
    PlusCursorHdl = GetCursor(plusCursor);
    ResetPolhemus();
    MakeRegions();
    for (;;)
        {
        HandleEvent();
        CheckForInput();
        }
}
/* end main */
```

APPENDIX B

© 1991 Walt Disney Imagineering

---

BrushMenus.c
Tuesday, February 5, 1991   4:25 PM

/*****
 * PolhemusMenus.c
 *

```
 * Routines for Polhemus demo menus.
 *
 *****/ include <SerialDvr.h> extern  void       ToPolhemus();
extern  void       SetRate(int);
extern  Str255     unitsString;
extern  Str255     IncrementString;
extern  int        baudRate;
extern  WindowPtr  PolhemusWindow;

/* constants */
#define NIL 0L
#define Pointer1 -1L
#define emptyString "\p"
#define inGlobal 1
#define inLocal 0

/* dialog/alert IDs */
#define AboutDialogID 128
#define IncrementDialogID 129
#define IncrementAlertID 130
#define DIPsettingDialogID 131

/* menu IDs */
#define AppleMenuID 1000
#define FileMenuID 1001
#define EditMenuID 1002
#define RS232MenuID 1003
#define PolhemusMenuID 1004
#define CommandMenuID 1005

/* apple menu items */
#define AboutItem 1

/* file menu items */
#define NewItem 1
#define OpenItem 2
#define SaveItem 3
#define SaveAsItem 4
#define CloseItem 5
#define QuitItem 7

/* edit menu items */
#define UndoItem 1
#define CutItem 3
#define CopyItem 4
#define PasteItem 5
#define ClearItem 6

/* rs232 menu items */
#define Baud19200Item 1
#define Baud9600Item 2
#define Baud4800Item 3
#define Baud2400Item 4
#define Baud1200Item 5
#define Baud300Item 6
#define DIPsetting 8

/* polhemus menu items */
#define Continuous 1
#define Send 2
#define Increment 3
#define Boresight 5
#define Averaging 7
```

```c
#define ASCII 9
#define Binary 10
#define Inches 11
#define Centimeters 12
#define AngleOutOnly 14
#define Reset 16

/*  command menu items */
#define PrintData 1
#define AdjustCursor 2
define PaintingMode 3 static MenuHandle appleMenu, fileMenu, editMenu, rsMenu, polMenu,
                  comMenu;
Point mousePosition;
int AdjustCursorFlag = false;
int PrintDataFlag = true;
int GraphicMode = false;

void
ResetPolhemus()
  {
  long OldTime, NewTime;
  int TimeCount = 5;
        /* Continuous default is off */
  CheckItem(polMenu,Continuous,false);
  EnableItem(polMenu,Send);
  DisableItem(polMenu,Increment);
        /* Boresight default is off */
  CheckItem(polMenu,Boresight,false);
        /* Averaging default is off */
  CheckItem(polMenu,Averaging,false);
        /* default ASCII mode */
  CheckItem(polMenu,ASCII,true);
  CheckItem(polMenu,Binary,false);
  EnableItem(polMenu,Inches);
  EnableItem(polMenu,Centimeters);
        /* default inches mode */
  CheckItem(polMenu,Inches,true);
  CheckItem(polMenu,Centimeters,false);
  stccpy(unitsString, &"\pinches\0",13);
        /* default output records */
  CheckItem(polMenu,AngleOutOnly,false);
  CheckItem(comMenu,AdjustCursor,false);
  DisableItem(comMenu,AdjustCursor);
        /* output the reset command */
  ToPolhemus("\031",1);
  print("Polhemus is being reset");
  OldTime = TickCount();
  while (TimeCount > 0)
    {
    NewTime = TickCount();
    if ((NewTime - OldTime) >= 60)
      {
      OldTime = NewTime;
      print(".");
      TimeCount--;
      }
    }
  print("ready.\015");
  }

/*
 * SetUpMenus()
 *
 */
```

```c
SetUpMenus()
{
  InsertMenu(appleMenu = GetMenu(AppleMenuID), 0);
  InsertMenu(fileMenu = GetMenu(FileMenuID), 0);
  InsertMenu(editMenu = GetMenu(EditMenuID), 0);
  InsertMenu(rsMenu = GetMenu(RS232MenuID), 0);
  InsertMenu(polMenu = GetMenu(PolhemusMenuID), 0);
  InsertMenu(comMenu = GetMenu(CommandMenuID), 0);
  DrawMenuBar();
  AddResMenu(appleMenu, 'DRVR');
}
/* end SetUpMenus */

/****
 * AdjustMenus()
 *
 * Enable or disable the items in the File & Edit menus if a DA window
 * comes up or goes away. The application doesn't do anything with
 * the File & Edit menus, except Quit.
 *
 ****/

AdjustMenus()
{
  /* determine if DA is running */
  register WindowPeek wp = (WindowPeek) FrontWindow();
  short kind = wp ? wp->windowKind : 0;
  Boolean DA = kind < 0;

enable(editMenu, UndoItem, DA);
  enable(editMenu, CutItem, DA);
  enable(editMenu, CopyItem, DA);
  enable(editMenu, PasteItem, DA);
  enable(editMenu, ClearItem, DA);

enable(fileMenu, NewItem, DA);
  enable(fileMenu, OpenItem, DA);
  enable(fileMenu, SaveItem, DA);
  enable(fileMenu, SaveAsItem, DA);
  enable(fileMenu, CloseItem, DA);

} static
enable(menu, item, ok)
  Handle menu;
  {
    if (ok)
      EnableItem(menu, item);
    else
      DisableItem(menu, item);
  }

/*****
 * HandleMenu(mSelect)
 *
 * Handle the menu selection. mSelect is what MenuSelect() and
 * MenuKey() return: the high word is the menu ID, the low word
 * is the menu item
 *
 *****/

UncheckBauds()
  /* clear multiple selection of baud rates */
```

```
        {
        CheckItem(rsMenu,Baud19200Item,false);
        CheckItem(rsMenu,Baud9600Item,false);
        CheckItem(rsMenu,Baud4800Item,false);
        CheckItem(rsMenu,Baud2400Item,false);
        CheckItem(rsMenu,Baud1200Item,false);
        CheckItem(rsMenu,Baud300Item,false);
        } stccpy(s1, s2, n)
    register char *s1, *s2;
    register int n;
    {
        register char *s0 = s1;
        if (n <= 0) return (0);
        while (n-- && (*s1++ = *s2++));
        if (n && *(s1-1)) *s1 = '\0';
        return (s1-s0-1);
    }

HandleMenu (mSelect)

long        mSelect;
{
    int         menuID = HiWord(mSelect);
    int         menuItem = LoWord(mSelect);
    Str255      name;
    GrafPtr     savePort;
    WindowPeek  frontWindow;
    DialogPtr   genDlgPtr;
    int         dummyInt;
    int         isChecked;
    int         itemType;
    Handle      itemHdl;
    Str255      text,text2,text3;
    char        ctext[10];
    Rect        box;
    int         i;
    int         dp;
    int         invalid;

switch (menuID)
        {
      case AppleMenuID:
        if (menuItem == AboutItem)
            {
            genDlgPtr = GetNewDialog(AboutDialogID, NIL, Pointer1);
            ModalDialog(NIL,&dummyInt);
            DisposDialog(genDlgPtr);
            }
        else
            {
            GetPort(&savePort);
            GetItem(appleMenu, menuItem, name);
            OpenDeskAcc(name);
            SetPort(savePort);
            }
        break;

case FileMenuID:
        switch (menuItem)
            {
            case QuitItem:
            QuitRoutines(noErr);
            break;
            }
        break;
```

```
case EditMenuID:
break;

case RS232MenuID:
  switch (menuItem)
    {
    case Baud19200Item:
      UncheckBauds();
      CheckItem(rsMenu, Baud19200Item, true);
      SetRate(baud19200);
      break;
    case Baud9600Item:
      UncheckBauds();
      CheckItem(rsMenu, Baud9600Item, true);
      SetRate(baud9600);
      break;
    case Baud4800Item:
      UncheckBauds();
      CheckItem(rsMenu, Baud4800Item, true);
      SetRate(baud4800);
      break;
    case Baud2400Item:
      UncheckBauds();
      CheckItem(rsMenu, Baud2400Item, true);
      SetRate(baud2400);
      break;
    case Baud1200Item:
      UncheckBauds();
      CheckItem(rsMenu, Baud1200Item, true);
      SetRate(baud1200);
      break;
    case Baud300Item:
      UncheckBauds();
      CheckItem(rsMenu, Baud300Item, true);
      SetRate(baud300);
      break;
    case DIPsetting:
      switch (baudRate)
        {
        case baud19200:
          stccpy(text, "\p\23\327\327\23\23\23\23\23", 256);
          break;
        case baud9600:
          stccpy(text, "\p\327\23\327\23\23\23\23\23", 256);
          break;
        case baud4800:
          stccpy(text, "\p\23\23\327\23\23\23\23\23", 256);
          break;
        case baud2400:
          stccpy(text, "\p\327\327\23\23\23\23\23\23", 256);
          break;
        case baud1200:
          stccpy(text, "\p\23\327\23\23\23\23\23\23", 256);
          break;
        case baud300:
          stccpy(text, "\p\327\23\23\23\23\23\23\23", 256);
          break;
        }
      stccpy(text2, "\p\23", 256);
      stccpy(text3, "\p\327", 256);
      ParamText(text,text2,text3,emptyString);
      genDlgPtr = GetNewDialog(DIPsettingDialogID, NIL, Pointer1);
      ModalDialog(NIL,&dummyInt);
      DisposDialog(genDlgPtr);
      break;
    }
  break;
```

```
case PolhemusMenuID:
  switch (menuItem)
    {
    case Continuous:
      GetItemMark(polMenu,Continuous,&isChecked);
      if (isChecked == noMark)
        {
        CheckItem(polMenu,Continuous,true);
        DisableItem(polMenu,Send);
        EnableItem(polMenu,Increment);
        print("Continuous updates: ON\015");
        ToPolhemus("C",1);
        }
      else
        {
        CheckItem(polMenu,Continuous,false);
        EnableItem(polMenu,Send);
        DisableItem(polMenu,Increment);
        print("Continuous updates: OFF\015");
        ToPolhemus("c",1);
        }
      break;
    case Send:
      ToPolhemus("P",1);
      break;
    case Increment:
      ResetAlrtStage();
      ParamText(unitsString,emptyString,emptyString,emptyString);
      genDlgPtr = GetNewDialog(IncrementDialogID, NIL, Pointer1);
      GetDItem(genDlgPtr, 2, &itemType, &itemHdl, &box);
      SetIText(itemHdl, IncrementString);
      /* get value & insure that it is valid number before exiting */
      do
        {
        ModalDialog(NIL,&dummyInt);
        GetDItem(genDlgPtr, 2, &itemType, &itemHdl, &box);
        GetIText(itemHdl,&text);
        dp = -1;
        invalid = false;
        for (i = 1; i < text[0]; i++)
          {
          if (dp >= 0)
            {
            if (dp > 2)
              invalid = true;
            else if (text[i] < '0')
              invalid = true;
            else if (text[i] > '9')
              invalid = true;
            dp++;
            }
          else
            {
            if (text[i] == '.')
              dp++;
            else if (text[i] < '0')
              invalid = true;
            else if (text[i] > '9')
              invalid = true;
            else if (i > 2)
              invalid = true;
            }
          text2[i-1] = text[i];
          }
        if (invalid != 0) NoteAlert(IncrementAlertID, NIL);
        }
      while (invalid != 0);
```

```
    stccpy(IncrementString,text,256);
    ToPolhemus("I",1);   /* send set increment command with value */
    ToPolhemus(text2,text[0]);
    ToPolhemus("\015",1);
    DisposDialog(genDlgPtr);
    break;
case Boresight:
    GetItemMark(polMenu,Boresight,&isChecked);
    if (isChecked == noMark)
        {
        CheckItem(polMenu,Boresight,true);
        ToPolhemus("B1\015",3);
        }
    else
        {
        CheckItem(polMenu,Boresight,false);
        ToPolhemus("b1\015",3);
        }
    break;
case Averaging:
    GetItemMark(polMenu,Averaging,&isChecked);
    if (isChecked == noMark)
        {
        CheckItem(polMenu,Averaging,true);
        ToPolhemus("K",1);
        }
    else
        {
        CheckItem(polMenu,Averaging,false);
        ToPolhemus("m",1);
        }
    break;
case ASCII:
    CheckItem(polMenu,ASCII,true);
    CheckItem(polMenu,Binary,false);
    EnableItem(polMenu,Inches);
    EnableItem(polMenu,Centimeters);
    ToPolhemus("F",1);
    break;
case Binary:
    CheckItem(polMenu,Binary,true);
    CheckItem(polMenu,ASCII,false);
    DisableItem(polMenu,Inches);
    DisableItem(polMenu,Centimeters);
    ToPolhemus("f",1);
    break;
case Inches:
    CheckItem(polMenu,Inches,true);
    CheckItem(polMenu,Centimeters,false);
    stccpy(unitsString, &"\pinches\0",13);
    ToPolhemus("U",1);
    break;
case Centimeters:
    CheckItem(polMenu,Centimeters,true);
    CheckItem(polMenu,Inches,false);
    ToPolhemus("u",1);
    stccpy(unitsString, &"\pcentimeters\0", 13);
    break;
case AngleOutOnly:
    GetItemMark(polMenu,AngleOutOnly,&isChecked);
    if (isChecked == noMark)
        {
        CheckItem(polMenu,AngleOutOnly,true);
        EnableItem(comMenu,AdjustCursor);
        ToPolhemus("O4,1\015",5);
        }
    else
```

```
              {
              CheckItem(polMenu,AngleOutOnly,false);
              CheckItem(comMenu,AdjustCursor,false);
              DisableItem(comMenu,AdjustCursor);
              ToPolhemus("k",1);
              }
           break;
         case Reset:
           ResetPolhemus();
           break;
         }
      break;

case CommandMenuID:
        switch (menuItem)
           {
           case PrintData:
             GetItemMark(comMenu,PrintData,&isChecked);
             if (isChecked == noMark)
                 {
                 CheckItem(comMenu,PrintData,true);
                 PrintDataFlag = true;
                 }
             else
                 {
                 CheckItem(comMenu,PrintData,false);
                 PrintDataFlag = false;
                 }
             break;
           case AdjustCursor:
             GetItemMark(comMenu,AdjustCursor,&isChecked);
             if (isChecked == noMark)
                 {
                 CheckItem(comMenu,AdjustCursor,true);
                 AdjustCursorFlag = true;
                 }
             else
                 {
                 CheckItem(comMenu,AdjustCursor,false);
                 AdjustCursorFlag = false;
                 }
             break;
           case PaintingMode:
             GetItemMark(comMenu,PaintingMode,&isChecked);
             if (isChecked == noMark)
                 {
                 CheckItem(comMenu,PaintingMode,true);
                 GraphicMode = true;
                 InvalRect(&PolhemusWindow->portRect);
                 }
             else
                 {
                 CheckItem(comMenu,PaintingMode,false);
                 GraphicMode = false;
                 InvalRect(&PolhemusWindow->portRect);
                 }
             break;
           }
      break;
      }
}

/* end HandleMenu */
```

APPENDIX C

© 1991 Walt Disney Imagineering

BrushMouse.c
Thursday, January 31, 1991 5:00 PM

```c
/*****
 * BrushMouse.c
 *
 * Routines for mouse activities, including cursor control and Polhemus->mouse event.
 *
 *****/ define inGlobal  1
define inLocal   0

/*
   per Mike Clark, though not used here...
   global variables: Point: mTemp, rawMouse
   put point in
   move byte: cursorCouple to cursorNew
   samples have tablet driver.a ... routine for reference
   should have system equates in MPW
   if raw mouse were not updated, jcursor will attempt to scale
*/ void
PutMouse(curpos, flag)
   /* move the mouse coordinates to curpos.      */
   /* if flag != 0, curpos is in Global coords.   */
   /* if flag == 0, curpos is in current window coords. */
   Point   *curpos;
   int     flag;

{
    extern  BitMap   screenBits;
    int              xmax, ymax, xmin, ymin;
    Point            pos;
    int              *ptr;
    char             *bptr;

/* set local variables */
    pos.v = curpos->v;
    pos.h = curpos->h;
    xmax = screenBits.bounds.right - 1;
    xmin = 0;
    ymax = screenBits.bounds.bottom - 3;
    ymin = 0;

/* convert to global coords if needed */
    if (! flag) LocalToGlobal(&pos);

/* clamp to screen bounds */
    if (pos.v > ymax) pos.v = ymax;
    if (pos.v < ymin) pos.v = ymin;
    if (pos.h > xmax) pos.h = xmax;
    if (pos.h < xmin) pos.h = xmin;

/* prepare pointers to mouse data */
    ptr = (int *) 0x828;
    bptr = (char *) 0x8ce;
```

```
    /* write data to mouse record and trigger update */
    *ptr++ = pos.v;
    *ptr++ = pos.h;
    *ptr++ = pos.v;
    *ptr++ = pos.h;
    *ptr++ = pos.v;
    *ptr   = pos.h;
    *bptr  = 0xff;
    return;
}

ExtractYaw()
{
    /* return an integer 100x the yaw angle */
}

ExtractPitch()
{
    /* return an integer 100x the pitch angle */
}
```

APPENDIX D

© 1991 Walt Disney Imagineering

BrushSerial.c
Wednesday, February 13, 1991  8:07 AM

```
/*****
 * BrushSerial.c
 *
 * Routines for Brush demo menus.
 *
 *****/ include <SerialDvr.h> define modemIn  -6
define modemOut -7
#define NIL 0L
define LF '\012' define inGlobal 1
define inLocal  0

/* positions in the Polhemus angle-only output stream */
#define pitchStart 10
define yawStart 3 extern WindowPtr  PolhemusWindow;
extern Rect       queenBounds;
extern Print();
extern void PutMouse();
extern int  AdjustCursorFlag;
extern int  PrintDataFlag;
extern int  GraphicMode;
OSErr errorCode;
int   baudRate;
char* InBuffer;
```

```
int     minusFlag;
long    yaw, pitch;
long    maxYaw = 0L, minYaw = 0L;
long    maxPitch = 0L, minPitch = 0L;

void
IOFailure(errorCode)
   {
      SysError(errorCode);
   } void
SetRate(rateCode)
    int rateCode;
   {
      errorCode = SerReset(modemIn, rateCode + stop10 + noParity + data8);
      if (errorCode != noErr) IOFailure(errorCode);
      errorCode = SerReset(modemOut, rateCode + stop10 + noParity + data8);
      if (errorCode != noErr) IOFailure(errorCode);
      baudRate = rateCode;
   } void
InitializeSerialPort()
   {
      static SerShk flags = {false, false, '\23', '\21', hwOverrunErr + framingErr,0,fal
      /* Open modem port and set handshaking parameters */
      errorCode = RAMSDOpen(sPortA);   /* open RAM serial drivers (in & out) for modem po
      if (errorCode != noErr) IOFailure(errorCode);

/* default to no hardware or software flow control */
      errorCode = SerHShake(modemIn, &flags);
      if (errorCode != noErr) IOFailure(errorCode);
      errorCode = SerHShake(modemOut, &flags);
      if (errorCode != noErr) IOFailure(errorCode);

SetRate(baud9600);
      InBuffer = NewPtr(1000);
      if (InBuffer == NIL) IOFailure(memFullErr);
      errorCode = SerSetBuf(modemIn,InBuffer,1000);
      if (errorCode != noErr) IOFailure(errorCode);
   }

CloseSerial()
   {
     RAMSDClose(sPortA);
     DisposPtr(InBuffer);
   } void
ToPolhemus(msg,len)
    char* msg;
    char len;
   {
    long length;
    length = len;
    errorCode = FSWrite(modemOut, &length, msg);
    if (errorCode != noErr) IOFailure(errorCode);
   } void
CheckForInput()
   {
```

```c
char tempString[2]; /* a C string used as an input buffer */
static Str255 inputString = 0; /* a P string used to accumulate output record */
SerStaRec serSta;
long count;
long oneCount;
static int inStringLength = 0;
int commandTerm;
int i;
char c;
Rect window;
Point p;

errorCode = SerStatus(modemIn, &serSta);
if (errorCode != noErr) IOFailure(errorCode);
if (serSta.cumErrs != noErr)
  {
  if (serSta.cumErrs && swOverrunErr)
    print("ERR: Data In, Software Overrun\015");
  else if (serSta.cumErrs && hwOverrunErr)
    print("ERR: Data In, Hardware Overrun\015");
  else if (serSta.cumErrs && framingErr)
    print("ERR: Data In, Framing Error\015");
  }
errorCode = SerGetBuf(modemIn,&count);
if (errorCode != noErr) IOFailure(errorCode);
if (count != 0)
  {
  /* get serial data up to linefeed*/
  commandTerm = false;
  while ((errorCode != eofErr) && (commandTerm == false))
    {
    oneCount = 1;
    errorCode = FSRead(modemIn, &oneCount, &tempString[0]);
    if ((errorCode != noErr) && (errorCode != eofErr)) IOFailure(errorCode);
    if (errorCode == noErr)
      {
      inputString[inStringLength++] = tempString[0];
      if (tempString[0] == LF) commandTerm = true;
      }
    }
  if (commandTerm) /* parse output record */
    {
    /* string from Polhemus received */
    inputString[inStringLength] = '\0';
    if (PrintDataFlag) print(inputString);

/* translate into pitch and yaw values */
    inStringLength = yawStart;
    yaw = 0;
    minusFlag = false;
    for (i = 0; i < 7; i++)
      {
      switch (c = inputString[inStringLength++])
        {
        case '-':
          minusFlag = true;
          break;
        case '.':
        case ' ':
          break;
        case '0':
        case '1':
        case '2':
        case '3':
        case '4':
        case '5':
        case '6':
```

```
        case '7':
        case '8':
        case '9':
           yaw = 10 * yaw + (int) c - (int) '0';
           break;
        }
      }
    if (minusFlag) yaw = -yaw;

pitch = 0;
    minusFlag = false;
    for (i = 0; i < 7; i++)
      {
        switch (c = inputString[inStringLength++])
          {
          case '-':
            {
            minusFlag = true;
            break;
            }
          case '.':
          case ' ':
            break;
          case '0':
          case '1':
          case '2':
          case '3':
          case '4':
          case '5':
          case '6':
          case '7':
          case '8':
          case '9':
            {
            pitch = 10 * pitch + (int) c - (int) '0';
            break;
            }
          }
      }
    if (minusFlag) pitch = -pitch;

/* note limits */
    if (yaw < minYaw) minYaw = yaw;
    if (yaw > maxYaw) maxYaw = yaw;
    if (pitch < minPitch) minPitch = pitch;
    if (pitch > maxPitch) maxPitch = pitch;

if (AdjustCursorFlag)
      {
      window = queenBounds; /*+++was+++(*PolhemusWindow).portRect;*/
      p.h = window.right - (yaw - minYaw) * (window.right - window.left) /
                    (maxYaw - minYaw);
      p.v = (pitch - minPitch) * (window.bottom - window.top) /
                    (maxPitch - minPitch) + window.top;
      PutMouse(&p,inLocal);
      if (GraphicMode) DrawEyes();
      }
    /* reset input string */
    inStringLength = 0;

}
  }
}
```

APPENDIX E

© 1991 Walt Disney Imagineering

```c
BrushWindow.c
Wednesday, February 13, 1991   9:34 AM

/*****
 * BrushWindow.c
 *
 *    The window routines for the Brush demo
 *
 *****/ extern  CursHandle  PlusCursorHdl;

WindowPtr PolhemusWindow;
Rect    dragRect;
Rect    windowBounds = { 20, 0, 480, 640 };
Rect    queenBounds  = { 100, 100, 200, 200 };
int     width = 5;
TEHandle console;
int     linesInWindow;
extern int      GraphicMode;
Pattern squares = {0xF0,0xF0,0xF0,0xF0,0x0F,0x0F,0x0F,0x0F};
Pattern hearts  = {0x00,0x6C,0x92,0x82,0x82,0x44,0x28,0x10};

#define NumberOfRegions 10

RgnHandle RegionNumber[NumberOfRegions];
RgnHandle tempRgn;

void
print(text)
  /* add text to window, scroll as needed */
  char* text;
  {
    long  length = 0;
    while (text[length] != '\0') length++;
    if ((**console).nLines >= linesInWindow)
       {
          (**console).selEnd = (**console).lineStarts
                     [(**console).nLines - linesInWindow + 1];
          (**console).selStart = 0;
          TEDelete(console);
       }
    (**console).selEnd = (**console).teLength;
    (**console).selStart = (**console).teLength;
    TEInsert(text,length,console);
  }

ClosePolhemusWindow()
  /* ready window for text stream...*/
  {
    TEDispose(console);
  }

SetUpWindow()
  /* Create the Polhemus Window, and open it. */
  {
    Rect  d,v;
    dragRect = screenBits.bounds;
```

```
    PolhemusWindow = NewWindow(0L, &windowBounds, "\pImageworks 3D Paint Demo", true,
    SetPort(PolhemusWindow);
    TextFont(monaco);
    TextSize(9);
    d.top = v.top = (*PolhemusWindow).portRect.top;
    d.left = v.left = (*PolhemusWindow).portRect.left;
    d.bottom = v.bottom = (*PolhemusWindow).portRect.bottom;
    d.right = v.right = (*PolhemusWindow).portRect.right;
    d.top += 4;
    d.left += 4;
    d.bottom -= 4;
    d.right -= 4;
    console = TENew(&d,&v);
    linesInWindow = (d.bottom - d.top)/ (**console).lineHeight;
    (**console).crOnly = -1;
    print("EyePhone/Polhemus Demo Active...\015");
  }

DrawPolhemusWindow(active)
  /* Draws the Polhemus window dressings. */
  short active;
  {
    Rect  myRect;
    int   color = true;
    int   i;
    SetPort(PolhemusWindow);
    EraseRect(&(*PolhemusWindow).portRect);
    if (!GraphicMode)
       {
       SetCursor(&arrow);
       PenPat(black);
       BackColor(whiteColor);
       ForeColor(blackColor);
       TEUpdate(&(*PolhemusWindow).portRect,console);
       }
    if (GraphicMode)
       {
       /* +++ redraw the region outlines (and buttons, if any) */
       SetCursor(*PlusCursorHdl);
       PenPat(black);
       BackColor(whiteColor);
       ForeColor(blackColor);
       for (i=0; i< NumberOfRegions; i++)
          {
          FrameRgn(RegionNumber[i]);
          }
       }
  }

/* definition order is important, as higher numbers are subtracted from lower */
#define skirt 0
#define trim 1
#define apron 4
#define blouse 2
#define arms 3
#define head 5
#define hat 6
#define mouth 7
#define brow 8
#define eyes 9

MakeRegions()
  /* create random regions in window */
  {
  int i=0,j;
  Rect r;
```

```
/*skirt 0*/
  RegionNumber[skirt] = NewRgn();
  OpenRgn();
MoveTo(0x006E,0x01A7);
LineTo(0x007D,0x0167);
LineTo(0x0095,0x0131);
LineTo(0x00A3,0x010F);
LineTo(0x00B6,0x0104);
LineTo(0x00CF,0x0106);
LineTo(0x00F7,0x0109);
LineTo(0x0119,0x0105);
LineTo(0x012B,0x0103);
LineTo(0x0147,0x0113);
LineTo(0x0165,0x0146);
LineTo(0x0179,0x0188);
LineTo(0x017D,0x01B0);
LineTo(0x006E,0x01A7);
  CloseRgn(RegionNumber[skirt]);

/*apron 1*/
  RegionNumber[apron] = NewRgn();
  OpenRgn();
MoveTo(0x00AC,0x01B2);
LineTo(0x00BA,0x0197);
LineTo(0x00C8,0x0167);
LineTo(0x00D9,0x0149);
LineTo(0x00E8,0x0131);
LineTo(0x00F7,0x0122);
LineTo(0x010A,0x0137);
LineTo(0x011D,0x0154);
LineTo(0x0129,0x016F);
LineTo(0x0135,0x018E);
LineTo(0x013E,0x01B0);
LineTo(0x0142,0x01BC);
LineTo(0x00AC,0x01B2);
  CloseRgn(RegionNumber[apron]);

/*arms 2*/
  RegionNumber[arms] = NewRgn();
  OpenRgn();
MoveTo(0x00D5,0x00F5);
LineTo(0x00CE,0x00F0);
LineTo(0x00C8,0x00F0);
LineTo(0x00C0,0x00F2);
LineTo(0x00B9,0x00F6);
LineTo(0x00B7,0x00FF);
LineTo(0x00BB,0x0105);
LineTo(0x00C0,0x0109);
LineTo(0x00C9,0x0109);
LineTo(0x00CF,0x0104);
LineTo(0x00D5,0x00F5);

MoveTo(0x011B,0x00F3);
LineTo(0x0122,0x00F1);
LineTo(0x012B,0x00F0);
LineTo(0x0134,0x00F4);
LineTo(0x0139,0x00F8);
LineTo(0x013A,0x00FF);
LineTo(0x0138,0x0102);
LineTo(0x0133,0x0107);
LineTo(0x0129,0x0109);
LineTo(0x0122,0x0107);
LineTo(0x011D,0x0105);
LineTo(0x011A,0x00FA);
LineTo(0x011B,0x00F3);
  CloseRgn(RegionNumber[arms]);
```

```
/*blouse 3*/
  RegionNumber[blouse] = NewRgn();
  OpenRgn();
MoveTo(0x00DC,0x00BD);
LineTo(0x00E0,0x00C3);
LineTo(0x00E7,0x00CD);
LineTo(0x00F6,0x00D3);
LineTo(0x0100,0x00D3);
LineTo(0x0109,0x00D1);
LineTo(0x010E,0x00CE);
LineTo(0x0114,0x00C9);
LineTo(0x011A,0x00C ;
LineTo(0x011D,0x00C0);
LineTo(0x011E,0x00BF);
LineTo(0x0123,0x00BE);
LineTo(0x012F,0x00C5);
LineTo(0x0135,0x00D0);
LineTo(0x013A,0x00DF);
LineTo(0x013B,0x00E8);
LineTo(0x0140,0x00EF);
LineTo(0x013D,0x00F8);
LineTo(0x0137,0x0108);
LineTo(0x0125,0x0108);
LineTo(0x0118,0x010E);
LineTo(0x0106,0x0111);
LineTo(0x00F4,0x0111);
LineTo(0x00DD,0x0110);
LineTo(0x00D1,0x010C);
LineTo(0x00CB,0x0109);
LineTo(0x00C0,0x0107);
LineTo(0x00B1,0x00FF);
LineTo(0x00B4,0x00E0);
LineTo(0x00BC,0x00CB);
LineTo(0x00C4,0x00C1);
LineTo(0x00CB,0x00C1);
LineTo(0x00DC,0x00BD);
  CloseRgn(RegionNumber[blouse]);

/*trim on skirt 4*/
  RegionNumber[trim] = NewRgn();
  OpenRgn();
MoveTo(0x0074,0x019F);
LineTo(0x0086,0x01A4);
LineTo(0x0098,0x01A4);
LineTo(0x00A1,0x019E);
LineTo(0x00A6,0x0199);
LineTo(0x00B1,0x017B);
LineTo(0x00BF,0x015B);
LineTo(0x00D1,0x013A);
LineTo(0x00E5,0x0124);
LineTo(0x00F1,0x0118);
LineTo(0x00F9,0x0122);
LineTo(0x0102,0x0119);
LineTo(0x0111,0x012C);
LineTo(0x011F,0x013D);
LineTo(0x012D,0x0154);
LineTo(0x013A,0x0171);
LineTo(0x0145,0x0187);
LineTo(0x014B,0x0199);
LineTo(0x0150,0x01A0);
LineTo(0x0156,0x01A3);
LineTo(0x015F,0x01A3);
LineTo(0x0169,0x01A3);
LineTo(0x016F,0x01A1);
LineTo(0x0180,0x01BF);
LineTo(0x0116,0x01B5);
LineTo(0x00B4,0x01B5);
```

```
LineTo(0x0089,0x01B8);
LineTo(0x0067,0x01B8);
LineTo(0x0067,0x01B8);
LineTo(0x0074,0x019F);
   CloseRgn(RegionNumber[trim]);

/*head 5*/
   RegionNumber[head] = NewRgn();
   OpenRgn();
MoveTo(0x00BD,0x00BB);
LineTo(0x00FE,0x00DB);
LineTo(0x0128,0x00BD);
LineTo(0x0128,0x00AD);
LineTo(0x010B,0x0075);
LineTo(0x0101,0x006A);
LineTo(0x00EA,0x006C);
LineTo(0x00BD,0x00BB);
   CloseRgn(RegionNumber[head]);

/*hat 6*/
   RegionNumber[hat] = NewRgn();
   OpenRgn();
MoveTo(0x00DF,0x007D);
LineTo(0x00F1,0x0071);
LineTo(0x00F7,0x006F);
LineTo(0x0107,0x0070);
LineTo(0x00FA,0x0055);
LineTo(0x00E6,0x0064);
LineTo(0x00DF,0x007D);
   CloseRgn(RegionNumber[hat]);

/*mouth 7*/
   RegionNumber[mouth] = NewRgn();
   OpenRgn();
MoveTo(0x00E8,0x00A9);
LineTo(0x00F2,0x00AA);
LineTo(0x00F8,0x00A8);
LineTo(0x00FF,0x00A8);
LineTo(0x0104,0x00A8);
LineTo(0x0108,0x00AA);
LineTo(0x010C,0x00A9);
LineTo(0x0112,0x00A5);
LineTo(0x0108,0x00B2);
LineTo(0x0102,0x00B5);
LineTo(0x00FE,0x00B6);
LineTo(0x00F6,0x00B3);
LineTo(0x00F0,0x00AE);
LineTo(0x00E8,0x00A9);
   CloseRgn(RegionNumber[mouth]);

/*brow 8*/
   RegionNumber[brow] = NewRgn();
   OpenRgn();
MoveTo(0x00F9,0x0083);
LineTo(0x00F7,0x007F);
LineTo(0x00F3,0x007F);
LineTo(0x00EE,0x0081);
LineTo(0x00EC,0x0087);
LineTo(0x00E9,0x008D);
LineTo(0x00EC,0x008F);
LineTo(0x00EE,0x008A);
LineTo(0x00F1,0x0085);
LineTo(0x00F4,0x0084);
LineTo(0x00F8,0x0084);
LineTo(0x00FA,0x0087);
LineTo(0x00FC,0x0087);
LineTo(0x00FC,0x0087);
LineTo(0x00F9,0x0083);
```

```
MoveTo(0x00FA,0x0084);
LineTo(0x00FE,0x007E);
LineTo(0x0109,0x0083);
LineTo(0x010B,0x0087);
LineTo(0x010C,0x008C);
LineTo(0x0109,0x008C);
LineTo(0x0106,0x0088);
LineTo(0x0104,0x0085);
LineTo(0x0101,0x0083);
LineTo(0x00FF,0x0086);
LineTo(0x00FC,0x0086);
LineTo(0x00FA,0x0084);
   CloseRgn(RegionNumber[brow]);

/*eyes 9*/
   RegionNumber[eyes] = NewRgn();
   OpenRgn();

#ifdef FALSE
   /* original pupil definitions */
MoveTo(0x00F5,0x0096);      /* $8A-$96 in height */
LineTo(0x00F2,0x0095);      /* $F1-$FA in width */
LineTo(0x00F1,0x0091);
LineTo(0x00F1,0x008E);
LineTo(0x00F4,0x008B);
LineTo(0x00F7,0x008A);
LineTo(0x00FA,0x008E);
LineTo(0x00FA,0x0091);
LineTo(0x00FA,0x0094);
LineTo(0x00F5,0x0096);

MoveTo(0x0104,0x008E);      /* $89-$95 in height */
LineTo(0x0104,0x0091);      /* $FB-$104 in width */
LineTo(0x0104,0x0093);
LineTo(0x0104,0x0095);
LineTo(0x00FF,0x0095);
LineTo(0x00FD,0x0095);
LineTo(0x00FB,0x0091);
LineTo(0x00FB,0x008F);
LineTo(0x00FB,0x008D);
LineTo(0x00FC,0x008B);
LineTo(0x00FD,0x008A);
LineTo(0x00FF,0x0089);
LineTo(0x0101,0x008A);
LineTo(0x0102,0x008B);
LineTo(0x0104,0x008C);
LineTo(0x0104,0x008E);
endif define leftEye   (0x0F1 + 0x0FA)/2
define rightEye  (0x0FB + 0x104)/2
#define eyeHeight (0x08A + 0x096)/2
#define eyeRadius 3

SetRect(&r, rightEye - eyeRadius,        eyeHeight - eyeRadius,
               rightEye + 2 * eyeRadius - 1, eyeHeight + 2 * eyeRadius - 1);
   FrameOval(&r);
   SetRect(&r, leftEye - eyeRadius,         eyeHeight - eyeRadius,
               leftEye + 2 * eyeRadius - 1,  eyeHeight + 2 * eyeRadius - 1);
   FrameOval(&r);

CloseRgn(RegionNumber[eyes]);

/* do region subtractions to purify zones of influence */
   for (i=0; i < NumberOfRegions-1; i++)
```

```
    {
    for (j=i+1; j < NumberOfRegions; j++)
       {
       DiffRgn(RegionNumber[i],RegionNumber[j],RegionNumber[i]);
       }
    }

/* calculate queen boundary rectangle for Polhemus scaling */
  queenBounds = (**(RegionNumber[0])).rgnBBox;
  for (i=1; i < NumberOfRegions; i++)
    {
    UnionRect(&queenBounds,&((**(RegionNumber[i])).rgnBBox),&queenBounds);
    }
  InsetRgn(RegionNumber[eyes],-1,-2);
  }

DrawRegionOutlines()
  {
  int i;
  for (i = 0; i < NumberOfRegions; i++)
    {
    /* clear to white */
    PenPat(black);
    ForeColor(white);
    PaintRgn(RegionNumber[i]);

/* outline in black */
    if (i != head)
      {
      PenPat(black);
      BackColor(whiteColor);
      ForeColor(blackColor);
      FrameRgn(RegionNumber[i]);
      }
    }
  }

DrawEyes()
  {
  static int blink = 0;
  Point p;
  int height;
  int slope;
  Point left,right;
  int temp;

left.h  = leftEye;
  left.v  = eyeHeight;
  right.h = rightEye;
  right.v = eyeHeight;

GetMouse(&p);

temp = (p.h == left.h) ? 100 : (5 * (p.v-left.v)) / (p.h-left.h);
  if (temp < 0) temp = -temp;
  if (temp == 0)
    {
    /* slope is less than 0.2*/
    if (p.h < left.h)
      left.h -= eyeRadius;
    else
      left.h += eyeRadius;
    }
  else if (temp <= 5)
    {
    /* slope is between 0.2 and 1.0 */
    if (p.h < left.h)
```

```
          left.h -= eyeRadius;
        else
          left.h += eyeRadius;
        if (p.v < left.v)
          left.v -= eyeRadius / 2;
        else
          left.v += eyeRadius / 2;
        }
      else if (temp <= 25)
        {
        /* slope is between 1.0 and 5.0 */
        if (p.h < left.h)
          left.h -= eyeRadius / 2;
        else
          left.h += eyeRadius / 2;
        if (p.v < left.v)
          left.v -= eyeRadius;
        else
          left.v += eyeRadius;
        }
      else
        {
        /* slope is grater than 5.0*/
        if (p.v < left.v)
          left.v -= eyeRadius;
        else
          left.v += eyeRadius;
        } temp = (p.h == right.h) ? 100 : (5 * (p.v-right.v)) / (p.h-right.h);
    if (temp < 0) temp = -temp;

if (temp == 0)
      {
      /* slope is less than 0.2*/
      if (p.h < right.h)
        right.h -= eyeRadius;
      else
        right.h += eyeRadius;
      }
    else if (temp <= 5)
      {
      /* slope is between 0.2 and 1.0 */
      if (p.h < right.h)
        right.h -= eyeRadius;
      else
        right.h += eyeRadius;
      if (p.v < right.v)
        right.v -= eyeRadius / 2;
      else
        right.v += eyeRadius / 2;
      }
    else if (temp <= 25)
      {
      /* slope is between 1.0 and 5.0 */
      if (p.h < right.h)
        right.h -= eyeRadius / 2;
      else
        right.h += eyeRadius / 2;
      if (p.v < right.v)
        right.v -= eyeRadius;
      else
        right.v += eyeRadius;
      }
    else
      {
      /* slope is grater than 5.0*/
```

```
    if (p.v < right.v)
      right.v -= eyeRadius;
    else
      right.v += eyeRadius;
    }

PenPat(black);
  ForeColor(whiteColor);
  PaintRgn(RegionNumber[eyes]);

blink++;
  blink %= 200;
  if (blink > 10)
    {
    ForeColor(blueColor);
    PenSize(3,3);
    MoveTo(left.h,left.v);
    LineTo(left.h,left.v);
    /* note that only a single height is used */
    MoveTo(right.h,left.v);
    LineTo(right.h,left.v);
    PenSize(1,1);
    }
  }

PaintFillAt(p)
  /* searches for region containing point p, then fills with current color & pattern */
  Point p;
  {
  int i=0;
  EventRecord dummyEvent;
  while (i < NumberOfRegions)
    {
    if ((i != eyes) && (i != head) && (PtInRgn(p,RegionNumber[i])))
      {
      SysBeep(10); /* sploot! sound */
      if ((i != brow) && (i != mouth) && (i != eyes))
        {
        RandomPattern();
        }
      else
        {
        PenPat(gray);
        }
      RandomColor();
      PaintRgn(RegionNumber[i]);

PenPat(black);
      BackColor(whiteColor);
      ForeColor(blackColor);
      if ( (i != brow) && (i != eyes) && (i != mouth))
        {
        FrameRgn(RegionNumber[i]);
        } i = NumberOfRegions;
      while (!SoundDone()); /* wait for beep to finish */
      while (GetNextEvent(mouseDown+mouseUp,&dummyEvent)); /* purge unneeded mice */
      }
    i++;
    }
  }

RandomPattern()
  /* selects a random rated pattern */
  {
  static int i = 0;
  i = (i + 1) % 4;
```

```
  switch (i)
    {
    case 0:
      PenPat(black);
      break;
    case 1:
      PenPat(squares);
      break;
    case 2:
      PenPat(hearts);
      break;
    case 3:
      PenPat(gray);
      break;
    }
}

RandomColor()
  /* selects random foreground and background colors */
  {
  static int i = 0;
  static int j = 0;
  i = (i + 1) % 8;
  j = (j + 1) % 7;
  switch (i)
    {
    case 0:
      ForeColor(blackColor);
      break;
    case 1:
      ForeColor(whiteColor);
      break;
    case 2:
      ForeColor(redColor);
      break;
    case 3:
      ForeColor(greenColor);
      break;
    case 4:
      ForeColor(blueColor);
      break;
    case 5:
      ForeColor(cyanColor);
      break;
    case 6:
      ForeColor(magentaColor);
      break;
    case 7:
      ForeColor(yellowColor);
      break;
    }
  switch ((i + j + 1) % 8)
    {
    case 0:
      BackColor(blackColor);
      break;
    case 1:
      BackColor(whiteColor);
      break;
    case 2:
      BackColor(redColor);
      break;
    case 3:
      BackColor(greenColor);
      break;
    case 4:
      BackColor(blueColor);
      break;
```

```
    case 5:
      BackColor(cyanColor);
      break;
    case 6:
      BackColor(magentaColor);
      break;
    case 7:
      BackColor(yellowColor);
      break;
  }
}
```

APPENDIX F

© 1991 Walt Disney Imagineering

```
Brush.R
Friday, February 8, 1991  4:17 PM

*
* Imageworks 3D Paint Demo: Resource File
*   ©1991 Walt Disney Imagineering
*   Research & Development
*   Bill Redmann
*

*
* Output File Spec
*

Brush.π.rsrc
????????

*
* Menus
* type MENU
,1000
\14
About Brush...
(-

,1001
File
(New
(Open
(Save
(Save As...
(Close
(-
Quit/Q

,1002
Edit
(Undo/Z
(-
(Cut/X
(Copy/C
(Paste/V
(Clear
```

,1003
RS232
19200
! 9600
4800
2400
1200
300
(-
DIP Setting...

,1004
Polhemus
Continuous Updates/C
Send Update/S
(Increment...
(-
Boresight/B
(-
Averaging/A
(-
! ASCII Output
Binary Output
! Inch Units
Centimeter Units
(-
Angle Output Only
(-
Reset/R ,1005
Commands
! Print Polhemus Data
(Adjust Cursor
Graphics Mode/G

*
* About Dialog
* type DLOG
,128
About Brush Demo
107 128 235 384
Visible NoGoAway
2              ;;plainDBox
0
128 type DITL
,129
1

PicItem Enabled
0 0 128 256
128

Type PICT = GNRL
,128
.H
28D9 0000 0000 0080 0100 1101
A000 82A1 0064 000A 5350 4E54
03E8 0001 0000 0100 0A00 0000
0002 D002 4009 AA55 AA55 AA55
AA55 2200 01FF 9DFF FFA1 00C0
0492 2520 5032 2D76 3135 202D 2043 6F70 7972 6967 6874 2031
3938 3820 5369 6C69 636F 6E20
4265 6163 6820 536F 6674 7761
7265 2C20 496E 632E 0D75 7365
7264 6963 742F 6D64 206B 6E6F
776E 7B63 7572 7265 6E74 6469
6374 206D 6420 6571 7D7B 6661
6C73 657D 6966 656C 7365 7B62
757D 6966 2063 7572 7265 6E74
6469 6374 2F50 325F 6420 6B6E
6F77 6E20 6E6F 747B 2F50 325F
627B 5032 5F64 0D62 6567 696E
7D62 696E 6420 6465 662F 5032
5F64 2032 3720 6469 6374 2064
6566 2075 7365 7264 6963 742F
6D64 206B 6E6F 776E 7B63 7572
7265 6E74 6469 6374 206D 6420
6571 7D7B 6661 6C73 657D 6966
656C 7365 2050 325F 6220 6475
7020 6475 700D 2F6D 6B20 6578
6368 2064 6566 7B6D 642F 7061
7420 6B6E 6F77 6E20 6D64 2F73
6720 6B6E 6F77 6E20 6D64 2F67
7220 6B6E 6F77 6E20 616E 6420
616E 647D 7B66 616C 7365 7D69
6665 6C73 652F 706B 2065 7863
6820 6465 667B 6D64 0D2F 7365
7454 784D 6F64 6520 6B6E 6F77
6E7D 7B66 616C 7365 7D69 6665
6C73 652F 736B 2065 7863 6820
6465 662F 627B 6269 6E64 2064
6566 7D62 696E 6420 6465 662F
7361 7B6D 6174 7269 7820 6375
7272 656E 746D 6174 7269 7820
5032 5F74 700D 636F 6E63 6174
2061 6C6F 6164 2070 6F70 7D62
2F73 627B 6D61 7472 6978 2063
7572 7265 6E74 6D61 7472 6978
2065 7863 6820 636F 6E63 6174
2050 325F 7470 206D 6174 7269
7820 696E 7665 7274 6D61 7472
6978 2063 6F6E 6361 7420 616C
6F61 640D 706F 707D 622F 7365
7B6D 6174 7269 7820 6173 746F
7265 2073 6574 6D61 7472 6978
7D62 2F62 627B 6773 6176 6520
5032 5F74 7020 636F 6E63 6174
206E 6577 7061 7468 206D 6F76
6574 6F7D 622F 6263 7B63 7572
7665 746F 7D62 2F62 6C0D 7B6C
696E 6574 6F7D 622F 6278 7B63
6C6F 7365 7061 7468 7D62 2F62
707B 6773 6176 6520 656F 6669
6C6C 2067 7265 7374 6F72 657D
622F 6266 7B73 6361 6C65 2031
2073 6574 6C69 6E65 7769 6474
6820 7374 726F 6B65 7D62 2F62
650D 7B67 7265 7374 6F72 657D
622F 707B 2F67 6620 6661 6C73
6520 6465 667D 622F 677B 2F67
6620 7472 7565 2064 6566 7D62
2067 2070 6B7B 2F5F 7061 742F
7061 7420 6C6F 6164 2064 6566
2F5F 6772 2F67 7220 6C6F 6164
2064 6566 7D7B 2F5F 6772 0D7B
3634 2E30 2064 6976 2073 6574
6772 6179 7D62 7D69 6665 6C73

```
6520 736B 7B2F 5F73 544D 2F73
6574 5478 4D6F 6465 206C 6F61
6420 6465 667D 6966 2F67 787B
2F74 6720 6578 6368 2064 6566
7D62 2030 2067 782F 7836 7B61
7620 3638 2067 740D 7B66 616C
7365 7D69 667D 6220 656E 6420
5032 5F62 2070 6B20 656E 647B
2F70 6174 7B50 325F 6220 6766
7365 6E64 2070 6F70 2073 6720
6176 2036 3820 6774 7B70 6F70
7D69 667D 7B2F 5F70 6174 206C
6F61 6420 656E 6420 6578 6563
7D0D 6966 656C 7365 7D62 696E
6420 6465 667D 7B2F 7061 747B
5032 5F62 2070 6F70 205F 6772
2065 6E64 7D62 696E 6420 6465
667D 6966 656C 7365 2050 325F
6220 736B 2065 6E64 7B2F 7365
7454 784D 6F64 657B 5032 5F62
2F5F 7354 4D20 6C6F 6164 0D65
6E64 2065 7865 6320 5032 5F62
2074 672F 5F67 7220 6C6F 6164
2065 6E64 2065 7865 637D 6269
6E64 2064 6566 7D7B 2F73 6574
5478 4D6F 6465 7B70 6F70 2050
325F 6220 7467 2F5F 6772 206C
6F61 6420 656E 6420 6578 6563
7D62 696E 640D 6465 667D 6966
656C 7365 7D69 660D 0700 0000
0022 0001 0001 FFFF A100 C000
6430 2030 2031 2069 6E64 6578
206E 6567 2031 2069 6E64 6578
206E 6567 206D 6174 7269 7820
7472 616E 736C 6174 6520 3320
3120 726F 6C6C 0D63 7572 7265
6E74 706F 696E 7420 3220 636F
7079 206D 6174 7269 7820 7472
616E 736C 6174 6520 3620 3120
726F 6C6C 0D22 007F 00FF 0101
A100 C000 8432 3536 2031 3238
2063 7572 7265 6E74 706F 696E
7420 3120 696E 6465 7820 3620
696E 6465 7820 7375 6220 3420
696E 6465 7820 3920 696E 6465
7820 7375 6220 6469 760D 3120
696E 6465 7820 3620 696E 6465
7820 7375 6220 3420 696E 6465
7820 3920 696E 6465 7820 7375
6220 6469 760D 6D61 7472 6978
2073 6361 6C65 2031 3120 3120
726F 6C6C 0DA1 00C0 006F 5B20
3920 3120 726F 6C6C 2063 6C65
6172 746F 6D61 726B 0D33 2032
2072 6F6C 6C20 6D61 7472 6978
2063 6F6E 6361 746D 6174 7269
780D 6578 6368 206D 6174 7269
7820 636F 6E63 6174 6D61 7472
6978 0D2F 5032 5F74 7020 6578
6368 2064 6566 2050 325F 6220
6D6B 2065 6E64 7B62 6E7D 6966
0D07 0001 0001 2200 01FF 9DFF
FFA1 0064 000A 5350 4E54 0EB8
000B 0000 A000 8CA1 0064 000A
5350 4E54 0BB8 0004 0003 0900
0000 0000 0000 0031 0000 C000
0080 0100 09FF FFFF FFFF FFFF
```

```
FF38 A100 6400 0A53 504E 540B
B800 0100 00A1 0064 001A 5350
4E54 0C26 0007 0008 0021 00FF
0005 0002 0000 0000 0000 0000
A100 6400 0A53 504E 540C 9400
0100 01A1 00C0 001D 5032 5F62
2030 2067 7820 7836 2065 6E64
2031 2073 6574 5478 4D6F 6465
0DA1 0096 000C 0500 0000 0200
0000 0000 0000 0100 0A00 0000
0000 1C02 402C 0009 0003 0647
656E 6576 6103 C003 0401 CD00
0C10 0080 0100 0080 0100 2B0E
181F 4272 7573 683A 2061 2050
6F6C 6865 6D75 7320 7061 696E
7469 6E67 2064 656D 6FA0 0097
A100 6400 0A53 504E 540B B800
0100 00A1 0064 001A 5350 4E54
0C26 0019 005A 0030 009F 0005
0002 0000 0000 0000 0000 A100
6400 0A53 504E 540C 9400 0100
01A1 00C0 001D 5032 5F62 2030
2067 7820 7836 2065 6E64 2031
2073 6574 5478 4D6F 6465 0DA1
0096 000C 0500 0000 0200 0000
0000 0000 0100 0A00 0000 0000
2B02 4004 000D 000A 2B52 100B
7665 7273 696F 6E20 312E 30A0
0097 A100 6400 0A53 504E 540B
B800 0100 00A1 0064 001A 5350
4E54 0C26 003A 0025 006B 00D8
0005 0002 0000 0000 0000 0000
A100 6400 0A53 504E 540C 9400
0100 01A1 00C0 001D 5032 5F62
2030 2067 7820 7836 2065 6E64
2031 2073 6574 5478 4D6F 6465
0DA1 0096 000C 0600 0000 0200
0000 0000 0000 0100 0A00 0000
0000 6602 4028 0049 002B 1FA9
3139 3931 2057 616C 7420 4469
736E 6579 2049 6D61 6769 6E65
6572 696E 670D 2B18 0D17 5265
7365 6172 6368 2026 2044 6576
656C 6F70 6D65 6E74 0D2B 020D
1442 696C 6C20 5265 646D 616E
6E20 312F 3234 2F39 31A0 0097
A100 6400 0A53 504E 540B B800
0C00 00A0 008D A100 6400 0653
504E 5403 E9A0 0083 FF
* End of picture data

*
* Increment Dialog
* type DLOG
,129 (4)
Set Update Increment
107 128 235 384
Visible NoGoAway
1                              ;;dBoxProc
0
129 type DITL
,129
3
```

Button Enabled
99 186 118 236
Ok

EditText Disabled
79 73 99 143
0

StatText Disabled
10 20 64 236
Enter minimum change required for automatic update (in ^0).

* Increment Alert type ALRT
,130 (4)
139 108 203 404
130
5511 type DITL
,130
2

Button Enabled
20 206 40 256
Ok

StatText Disabled
5 72 59 186
Acceptable numeric format is 12.34

* DIPsettings Dialog type DLOG
,131 (4)
DIP Switch Settings
107 128 205 404
Visible NoGoAway
1                          ;;dBoxProc
0
131 type DITL
,131
2

Button Enabled
59 206 88 256
Ok

StatText Disabled
10 20 64 266
Set DIP switches on EyePhone control box like this: ^0, where ^1 is off and ^2 is on.

* Icon type ICN# = GNRL
,128
.H

```
*icon data
0000 0000 0000 0000
0000 0000 0000 0000
0000 0000 0000 0000
0700 0000 0700 0000
0740 0000 0240 0000
0F80 0000 121C 0000
2218 0000 0214 0000
CF02 0000 10A1 0FFE
2090 8FFF 0008 4FFF
0004 281F 0002 0BDF
0001 4B5F 0000 CA5F
0001 CBDF 0000 080F
0000 0801 0000 0801
0000 0801 0000 0841
0000 0F81 0000 0801
0000 0801 0000 0FFF
*icon mask
0000 0000 0000 0000
0000 0000 0000 0000
0000 0000 0F80 0000
0F80 0000 0FE0 0000
0FE0 0000 1FE0 0000
3FFE 0000 7FFE 0000
773E 0000 7FBF 0000
3FFF 9FFF 7FFF DFFF
73FF FFFF 71FF FFFF
001F FFFF 000F FFFF
0007 FFFF 0003 FFFF
0003 FFFF 0003 FFFF
0000 1FFF 0000 1FFF
0000 1FFF 0000 1FFF
0000 1FFF 0000 1FFF
0000 1FFF 0000 1FFF

*
* Bundle Data
* type FREF
,128
APPL 0 type IW3p = STR
,3
Imageworks 3D Paint Demo, ©1991 Bill Redmann, Walt Disney Imagineering R&D type BNDL
,128
IW3p 0
ICN#
0 128
FREF
0 128
```

I claim:

1. An image display apparatus, comprising:
    a contoured, three-dimensional object;
    a projector that projects a visual image upon said contoured, three-dimensional object so as to thereby impart visual attributes to said contoured, three-dimensional object;
    interface means including a user interface and a simplified guest interface for receiving data from a user, via said user interface, that define an artwork file including parameters of graphics information that is to be projected onto the contoured, three-dimensional object, for receiving data from a guest, via said simplified guest interface, representative of a location upon said contoured, three-dimensional object and graphic information to be projected upon said contoured, three-dimensional object at said location, and for thereby generating and modifying said visual image to impart said visual attributes to desired locations of said contoured, three-dimensional object; and,
    data processing means for generating, in response to data received by said interface means, said visual image and for controlling said projector so as to project said visual image in alignment with said contoured, three-dimensional object such that said graphic information is reflected in said visual image at the selected location.

2. An image display apparatus according to claim 1, wherein:

said interface means includes interaction means whereby the guest may observe projection of a cursor that represents an active position of said interface means, and input said data to modify said display image; and, said data processing means controls said projector to reflect input data in real-time, such that the guest may interactively modify visual attributes imparted to said contoured, three-dimensional object by said display image.

3. An image display apparatus comprising:

a three-dimensional object;

a projector having a lens system and being aligned so as to project light upon the three-dimensional object, said projector including addressable light filter means for selectively filtering the light of the projector so that an image is projected upon the three-dimensional object;

user interface means for receiving data from a user to create at least one region corresponding to said image;

simplified guest interface means for selecting among regions corresponding to the three-dimensional object and for selectively changing the graphical content of a selected region;

a color pattern generator that is responsive to the simplified guest interface means to selectively generate a current color pattern that may be painted in the selected region; and, data processing means responsive to the user interface means for creating regions for filling a region with the color pattern in response to the an impetus to draw or fill a region from the simplified guest interface means and in response to the color pattern generator, and for controlling the addressable light filter means to cause the projection of the image upon the three-dimensional object.

4. The apparatus of claim 3, wherein the simplified guest interface means includes a guest data input which indicates a guest's decision either to change the current color pattern or a decision to paint a particular region of the three-dimensional object with the current color pattern, and wherein the addressable light filter means may be driven by the computer's monitor output signal.

5. The apparatus of claim 3, wherein the simplified guest interface means includes a polhemus device having an output that corresponds to a selected position on the three-dimensional object.

6. The apparatus of claim 3, wherein the data processing mean includes a memory for storing a plurality of images for sequential projection upon the three-dimensional object.

7. A method of projecting an image onto a three-dimensional object, comprising the steps of:

(a) entering region data into a user interface to create at least one region that corresponds to a portion of the object;

(b) entering pattern data into a simplified guest interface to select a current pattern corresponding to a region;

(c) processing the pattern data to generate an output representing an image corresponding to the object;

(d) projecting the image onto the object such that selected patterns for each region are projected upon each portion of the object corresponding to said regions; and (e) controlling the projection in response to the output such that the projected image is updated to reflect new pattern data.

8. The method of claim 7, further comprising the step of storing the output representing the image in a buffer and then processing that stored output with data entered into the simplified guests interface to interactively modify the image.

9. The method of claim 7, further comprising the step of (f) storing the output representing the image in a memory such that it may be recalled and subsequently projected onto the object as desired.

10. The method of claim 9, further comprising the steps of:

(g) storing the output representing the image in a buffer and then processing that stored output with data entered into the simplified guest interface to interactively modify the image storing a plurality of outputs to form a sequence of different but related images for sequential projection upon the object, and (h) performing steps (f) and (g) a plurality of times to form a sequence in memory of related images for sequential projection upon the object.

11. The method of claim 7, wherein:

the step of projecting the image onto the object includes the step of projecting light through a light filter, and the step of controlling the projection in response to the output includes the step of controlling the light filter to subtract projected light.

12. The method of claim 11, wherein:

the step of projecting light through the light filter includes the step of projecting light through optically superposed liquid crystal panels to project the image onto the object, and the step of controlling the light filter includes the step of controlling two or more optically superposed liquid crystal panels in response to the output to thereby reproduce corresponding color components of the image.

13. The method of claim 7, wherein the step of processing the pattern data to generate an output representing the image corresponding the object includes the step of displaying the image upon a monitor for viewing by the user.

14. The method of claim 7, wherein:

the step of processing the data to generate an output includes the step of identifying a region corresponding to the area of the object selected and painting the region with the current color pattern; and the step of controlling the projection in response to the output includes the step of projecting the color pattern upon the portion of the object corresponding to said region.

15. The method of claim 7, wherein:

the step of entering data into the simplified guest interface to select a current color pattern includes the steps of entering, via the simplified guest interface, data to indicate a decision to projectively draw upon the object and data corresponding to a point on the object;

the step of processing the data to generate an output includes the step of identifying a pixel within a region corresponding to the point on the object and painting that pixel with a selected current color pattern; and the step of controlling the projection in response to the output includes the step of projecting the selected color pattern upon an area of the object corresponding to said pixel.

16. A method of projecting light onto a three-dimensional object comprising the steps of:

(a) entering, via a user interface, graphics data defining a region corresponding to a portion the three-dimensional object;

(b) retrieving data from a simplified guest interface indicative of a point on the object, said simplified guest interface being manipulable by a guest to identify various points on the object;

(c) retrieving data entered by the guest at the simplified guest interface indicative of a decision by the guest to select a current color pattern to be projected upon the object and processing said data indicative of a decision to select a current color pattern;

(d) retrieving data entered by the guest at the simplified guest interface indicative of a decision to project the current color pattern upon an area on the object and processing said data indicative of a decision to project the current color pattern upon an area of the object and said data indicative of a point on the object to select a region corresponding to said point and to paint that region with the current color pattern;

(e) processing the data received to format an image containing the region to be projected upon the object; and (f) projecting the image upon the object.

17. An image display apparatus, comprising:
a contoured, three-dimensional object;
a user interface that generates a first group of electronic signals in response to input decisions of a user;
a simplified guest interface, distinct from said user interface, that generates a second group of electronic signals in response to input decisions of a guest;
a projector aligned to project a visual image upon said contoured, three-dimensional object;
a data processor that is coupled to said user interface to receive said first group of electronic signals, and also to said simplified guest interface to receive said second group of electronic signals, said data processor having an output to said projector that is an electronic projection signal that defines said visual image and causes said projector to project the same in alignment upon said contoured, three-dimensional object, said data processor including
software that directs said data processor to process said first group of electronic signals received from said user interface to generate parameters of an artwork file, said parameters corresponding to the contours of said contoured, three-dimensional object, software that causes said data processor to
process said second group of electronic signals received from said simplified guest interface and said artwork file to define values of display variables associated within the parameters of said artwork file, and
generate therefrom an electronic computer image that corresponds to said contoured, three-dimensional image by defining visual attributes to be imparted to locations upon said contoured, three-dimensional object in response to said defined values, and,
software that generates said electronic projection signal from said electronic computer image and that causes said projector to project said visual image in response thereto.

18. A display apparatus according to claim 17, wherein said projector is a light valve projector that includes three superimposed subtractive light filters, a first filter approximately yellow in color, a second approximately magenta in color, and a third filter approximately cyan in color, said light filters superimposed along a common optical axis to subtractively create and project said visual image.

19. A display apparatus according to claim 17, wherein:
said simplified guest interface is selected from one of a polhemus device, a computer mouse, a joystick and a stylus and digitizing pad; and,
said second group of electronic signals includes a position signal that represents a location upon said contoured, three-dimensional object.

20. A display apparatus according to claim 19, wherein:
said second group of electronic signals further includes a pattern selection signal that represents a guest's choice of pattern, from among a pallet of patterns, to be displayed at an approximate location upon said contoured, three-dimensional object, as indicated by said position signal; and,
said display apparatus further comprises display means for displaying a current pattern to the guest, said current pattern selected from a pallet of patterns.

21. A display apparatus according to claim 19, wherein:
said software that directs said data processor to process said first group of electronic signals includes
software that directs said data processor to process said first group of electronic signals received from said user interface to define parameters for an artwork file, said parameters including an outline that corresponds to at least one physical attribute of said three-dimensional object and that defines a geographic region;
said software that directs said data processor to process said second group of electronic signals includes
software that directs said data processor to process said second group of electronic signals received from said simplified guest interface to define display variables within said parameters, including color and texture of said geographic region upon said three-dimensional object; and,
said software that controls said projector includes
software that directs said projector to project said visual image in response to receipt of each of said first group of electronic signals and said second group of electronic signals in real-time, such that said outline and alterations to said display variables are displayed when created and such that selected color and texture is displayed in general alignment upon said physical attribute.

22. A display apparatus according to claim 17, wherein:

said software that directs said data processor to process said first group of electronic signals includes
software that directs said data processor to process said first group of electronic signals received from said user interface to define parameters for an artwork file, including a contour outline that corresponds to said three-dimensional object and that defines a geographic region; and, said software that directs said data processor to process said second group of electronic signals includes
software that directs said data processor to process said second group of electronic signals received from said simplified guest interface to define display variables within said parameters, including color and texture of said geographic region, and,
software that selectively saves to memory a sequence of successive ones of said visual image, said sequence representative of animation to be imparted to said contoured, three-dimensional object by rapid projection of said successive visual images.

23. A method of projecting a visual image onto a contoured, three-dimensional object, to thereby impart visual attributes to the contoured, three-dimensional object using a computer, associated memory and graphics software, a projector, a user interface and a simplified guest interface, said method comprising the steps of:

entering data into the user interface to define a computer artwork file, including a plurality of regions that correspond to portions of the contoured, three-dimensional object;
entering data into the simplified guest interface to select one of a location upon the contoured, three-dimensional object and a pattern to be associated with a preselected location, the preselected location defined by data also entered into the simplified guest interface;
collecting a plurality of such data input to the simplified guest interface, such that a plurality of simplified guest interface are associated with preselected locations;
processing the collected data with the computer and generating an electronic computer image that corresponds to the contoured, three-dimensional object, the electronic computer image representative of the selected patterns and associated locations;
storing the electronic computer image in memory for subsequent modification; and,
generating with the computer an electronic projection signal that causes the projector to project the visual image such that selected patterns are displayed upon their associated locations upon the contoured, three-dimensional object.

24. A method according to claim 23, further comprising the step of repeatedly processing the electronic computer image in memory to interactively modify the visual image.

25. A method according to claim 23, further comprising the steps of:

generating a sequence of successive, related electronic computer images; and,
generating therefrom and projecting a corresponding sequence of visual images upon the contoured, three-dimensional object to impart animation thereto.

26. A method according to claim 23, wherein a liquid crystal filter is positioned between an objective lens and a condensing lens of the projector, wherein the liquid crystal filter is adapted to separately filter pixels of light transmitted through the filter, and wherein the step of generating an electronic projection control signal that causes said projector to project the visual image includes the steps of formatting the electronic projection signal to represent subtraction of light to thereby arrive at a formatted signal representation of the visual image; and,
applying the formatted signal to the liquid crystal filter to thereby control the liquid crystal filter to selectively block light at pixels of the liquid crystal filter to thereby project the visual image.

27. A method according to claim 26, wherein at least three such liquid crystal filters are used, each constituting a different color filter and being optically superimposed with respect to each other, wherein said method further comprises the steps of:

formatting the electronic projection signal to represent subtraction of light for each different color component of the three liquid crystal filters to thereby arrive at three representations of portions of the visual image; and,
applying the three representations to associated liquid crystal filters to thereby control the liquid crystal filters to successively and selectively block light at pixels of the liquid crystal filters that corresponds to unwanted color components, to thereby project the visual image.

28. A method of projecting light onto a contoured, three-dimensional object using a computer, the computer having associated memory and running graphics software, a user interface that is adapted to be used in creating an artwork file, a simplified guest interface, distinct from the user interface, that permits a guest to select a pattern for projection onto a selected physical attribute of the contoured, three-dimensional object, and a projector that projects an image that is electronically generated by the computer, said method comprising the steps of:

tracing an outline of the three-dimensional object with the user interface by interactively using the projector to project the outline onto the three-dimensional object, to thereby create a computer artwork file that defines parameters for graphics information that may be projected onto desired areas of the three-dimensional object;
using the user interface to define regions bearing a spacial relationship to the outline and that thereby also correspond to locations on the contoured, three-dimensional object to thereby define further parameters of the artwork file;
causing the computer to repeatedly format an electronic projection signal that represents a display image to be projected upon the contoured three-dimensional object, the display image sized and formatted such that projected regions align with their associated locations;

projecting the display image represented by the electronic projection signal upon the contoured, three-dimensional object; and, providing the guest with the simplified guest interface to thereby allow the guest to select at least one of a location upon the contoured, three-dimensional object and a pattern (from among a pallet of patterns), and also to thereby allow the guest to indicate a decision to paint a selected location with a selected pattern.

29. A method according to claim 28, wherein each of the steps of causing the computer to repeatedly format an electronic projection signal, projecting the display image represented by the electronic projection signal upon the contoured, three-dimensional object and providing the guest with the simplified guest interface is repeatedly performed, such that once an outline and region information has been created by the user, a guest may repeatedly modify visual attributes imparted to the three-dimensional object by the display image.

30. A method according to claim 28, wherein the step of providing the guest with the simplified guest interface includes the step of thereby allowing the guest to indicate a decision to paint an entire region of the contoured, three-dimensional object (as defined by the artwork file) in which a selected location falls within with a selected pattern.

* * * * *